United States Patent
Sanchez et al.

(10) Patent No.: US 12,159,294 B2
(45) Date of Patent: Dec. 3, 2024

(54) SYSTEMS AND METHODS FOR PREDICTING TRIP DATA

(71) Applicant: QUANATA, LLC, San Francisco, CA (US)

(72) Inventors: Kenneth Jason Sanchez, San Francisco, CA (US); Daniel Parks, El Cerrito, CA (US)

(73) Assignee: QUANATA, LLC, San Francisco, CA (US)

( * ) Notice: Subject to any disclaimer, the term of this patent is extended or adjusted under 35 U.S.C. 154(b) by 0 days.

(21) Appl. No.: 17/731,156

(22) Filed: Apr. 27, 2022

(65) Prior Publication Data

US 2024/0087037 A1 Mar. 14, 2024

Related U.S. Application Data

(60) Provisional application No. 63/181,443, filed on Apr. 29, 2021.

(51) Int. Cl.
*G06Q 40/08* (2012.01)
*G06Q 30/0211* (2023.01)
*G06Q 30/0235* (2023.01)

(52) U.S. Cl.
CPC ..... *G06Q 30/0211* (2013.01); *G06Q 30/0235* (2013.01); *G06Q 40/08* (2013.01)

(58) Field of Classification Search
CPC .................................................. G06Q 40/08
USPC ............................................................ 705/4
See application file for complete search history.

(56) References Cited

U.S. PATENT DOCUMENTS

| | | | | |
|---|---|---|---|---|
| 5,797,134 A | * | 8/1998 | McMillan | G06Q 40/08 705/400 |
| 8,140,358 B1 | * | 3/2012 | Ling | G07C 5/008 340/439 |
| 8,311,858 B2 | * | 11/2012 | Everett | G07C 5/008 340/576 |
| 8,538,789 B1 | | 9/2013 | Blank et al. | |
| 8,799,036 B1 | * | 8/2014 | Christensen | G06Q 40/08 340/439 |
| RE47,225 E | * | 2/2019 | Flick | G08B 21/02 |
| 10,354,333 B1 | * | 7/2019 | Hayward | G08G 1/166 |

(Continued)

OTHER PUBLICATIONS

Siami, Mohammad, et al. "A Mobile Telematics Pattern Recognition Framework for Driving Behavior Extraction." IEEE Transactions on Intelligent Transportation Systems, vol. 22, No. 3, Mar. 2021. (Year: 2021).

*Primary Examiner* — Robert R Niquette
(74) *Attorney, Agent, or Firm* — BRYAN CAVE LEIGHTON PAISNER LLP

(57) ABSTRACT

Method, system, device, and non-transitory computer-readable medium for predicting trip data. In one aspect, a computer-implemented method includes: obtaining a first set of trip data associated with a first set of vehicular trips operated by a vehicle operator during a first time period, the first set of trip data including a first set of telematics data and a first set of travel conditions; obtaining a second set of travel conditions associated with a second set of vehicular trips associated with a second time period separate from the first time period; and determining a second set of telematics data associated with a target vehicular trip based at least in part upon the first set of telematics data, the first set of travel conditions, and the second set of travel conditions.

20 Claims, 4 Drawing Sheets

(56) References Cited

U.S. PATENT DOCUMENTS

| | | | |
|---|---|---|---|
| 10,909,629 B1 | 2/2021 | Madigan et al. | |
| 10,916,075 B1 | 2/2021 | Webster et al. | |
| 2009/0024419 A1* | 1/2009 | McClellan | G06Q 40/08 |
| | | | 705/4 |
| 2010/0131304 A1* | 5/2010 | Collopy | G06Q 30/0224 |
| | | | 705/4 |
| 2011/0106370 A1* | 5/2011 | Duddle | G09B 9/042 |
| | | | 701/31.4 |
| 2011/0137684 A1* | 6/2011 | Peak | G06Q 30/02 |
| | | | 707/E17.046 |
| 2012/0072241 A1 | 3/2012 | Krause et al. | |
| 2012/0072244 A1* | 3/2012 | Collins | G06Q 10/10 |
| | | | 705/4 |
| 2012/0101855 A1* | 4/2012 | Collins | G06Q 40/08 |
| | | | 705/4 |
| 2012/0109692 A1* | 5/2012 | Collins | G06Q 40/08 |
| | | | 705/4 |
| 2013/0317862 A1 | 11/2013 | Fernandes et al. | |
| 2014/0257874 A1* | 9/2014 | Hayward | G07C 5/00 |
| | | | 705/4 |
| 2015/0006207 A1* | 1/2015 | Jarvis | G06Q 10/06398 |
| | | | 705/4 |
| 2015/0278864 A1 | 10/2015 | McDevitt | |
| 2017/0076396 A1* | 3/2017 | Sudak | G07C 5/085 |
| 2017/0364821 A1 | 12/2017 | Mathur et al. | |
| 2018/0047107 A1* | 2/2018 | Perl | G06N 5/02 |
| 2019/0012909 A1 | 1/2019 | Mintz | |
| 2019/0102840 A1 | 4/2019 | Perl et al. | |
| 2020/0062274 A1 | 2/2020 | Kowal et al. | |
| 2021/0110480 A1* | 4/2021 | Kwak | G07C 5/008 |
| 2021/0256616 A1* | 8/2021 | Hayward | G06V 30/274 |
| 2023/0048622 A1* | 2/2023 | Hayward | G08G 1/096827 |

\* cited by examiner

SYSTEMS AND METHODS FOR PREDICTING TRIP DATA

CROSS-REFERENCES TO RELATED APPLICATIONS

This application claims priority to U.S. Patent Application No. 63/181,443 filed Apr. 29, 2021, which is incorporated by reference herein for all purposes.

The following four applications, including this one, are being filed concurrently and the other three are hereby incorporated by reference in their entirety for all purposes:
1. U.S. patent application Ser. No. 17/731,156, titled "SYSTEMS AND METHODS FOR PREDICTING TRIP DATA";
2. U.S. patent application Ser. No. 17/731,157, titled "SYSTEMS AND METHODS FOR TERMINATING TRIP DATA COLLECTION";
3. U.S. patent application Ser. No. 17/731,161, titled "SYSTEMS AND METHODS FOR ADJUSTING A DYNAMIC DISCOUNT"; and
4. U.S. patent application Ser. No. 17/731,166, titled "SYSTEMS AND METHODS FOR SELECTIVE TRIP DATA COLLECTION".

FIELD OF THE DISCLOSURE

Some embodiments of the present disclosure are directed to management of telematics data. More particularly, certain embodiments of the present disclosure provide systems and methods for predicting trip data. Merely by way of example, the present disclosure has been applied to the field of telematics data, but it would be recognized that the present disclosure has much broader range of applicability.

BACKGROUND

Generally, a driver's driving behavior during a vehicle trip may be monitored for insurance related purposes. Various data generated by a mobile device of the driver may be collected and analyzed to determine whether the driver was practicing safe driving (e.g., how much the driver was distracted while driving). Such data may include telematics data that indicate driving maneuvers made during the trip (e.g., braking, acceleration, turning, stopping, etc.), device interaction data that indicate user interactions with the mobile device during the trip (e.g., turning on the device, moving the device, tapping on the screen, looking at the screen, texting, making a phone call, interacting with an app, etc.), and vehicle data that indicates a mileage of the vehicle. The telematics data and/or the device interaction data may be captured by one or more sensors associated with the mobile device such as an accelerometer, a gyroscope, a camera, a GPS sensor, etc. However, sometimes, the telematics data, the device interaction data, and/or the vehicle data may include inconsistent data. Accordingly, there is a need to determine how to interpret telematics data with inconsistency.

It is with respect to these and other general considerations that embodiments have been described. Also, although relatively specific problems have been discussed, it should be understood that the embodiments should not be limited to solving the specific problems identified in the background.

BRIEF SUMMARY OF THE DISCLOSURE

Some embodiments of the present disclosure are directed to management of telematics data. More particularly, certain embodiments of the present disclosure provide systems and methods for predicting trip data. Merely by way of example, the present disclosure has been applied to the field of telematics data, but it would be recognized that the present disclosure has much broader range of applicability.

Aspects of the present disclosure relate to a computer-implemented method for predicting trip data, a system for predicting trip data, and a non-transitory computer-readable medium storing instructions for predicting trip data. The computer-implemented method includes a set of operations. The computing system includes one or more processors and a memory storing instructions that, upon execution by the one or more processors, cause the computing system to perform the set of operations. The non-transitory computer-readable medium storing instructions that, upon execution by one or more processors of a computing system, cause the computing system to perform the set of operations. In various aspects, the set of operations includes: obtaining a first set of trip data associated with a first set of vehicular trips operated by a vehicle operator during a first time period, the first set of trip data including a first set of telematics data and a first set of travel conditions; obtaining a second set of travel conditions associated with a second set of vehicular trips associated with a second time period separate from the first time period; and determining a second set of telematics data associated with a target vehicular trip based at least in part upon the first set of telematics data, the first set of travel conditions, and the second set of travel conditions.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Depending upon the embodiment, one or more benefits may be achieved. These benefits, features, and advantages of the present disclosure can be fully appreciated with reference to the detailed description and accompanying drawings that follow.

BRIEF DESCRIPTION OF THE DRAWINGS

Non-limiting and non-exhaustive examples are described with reference to the following Figures.

DETAILED DESCRIPTION OF THE DISCLOSURE

In the following detailed description, references are made to the accompanying drawings that form a part hereof, and in which are shown by way of illustrations specific embodiments or examples. These aspects may be combined, other aspects may be utilized, and structural changes may be made without departing from the present disclosure. Embodiments may be practiced as methods, systems, or devices. Accordingly, embodiments may take the form of a hardware implementation, an entirely software implementation, or an implementation combining software and hardware aspects. The following detailed description is therefore not to be taken in a limiting sense, and the scope of the present disclosure is defined by the appended claims and their equivalents.

Some embodiments of the present disclosure are directed to management of telematics data. More particularly, certain embodiments of the present disclosure provide systems and methods for predicting trip data. Merely by way of example, the present disclosure has been applied to the field of telematics data, but it would be recognized that the present disclosure has much broader range of applicability.

One or More Methods for Predicting Trip Data According to Various Embodiments

Figure 1:
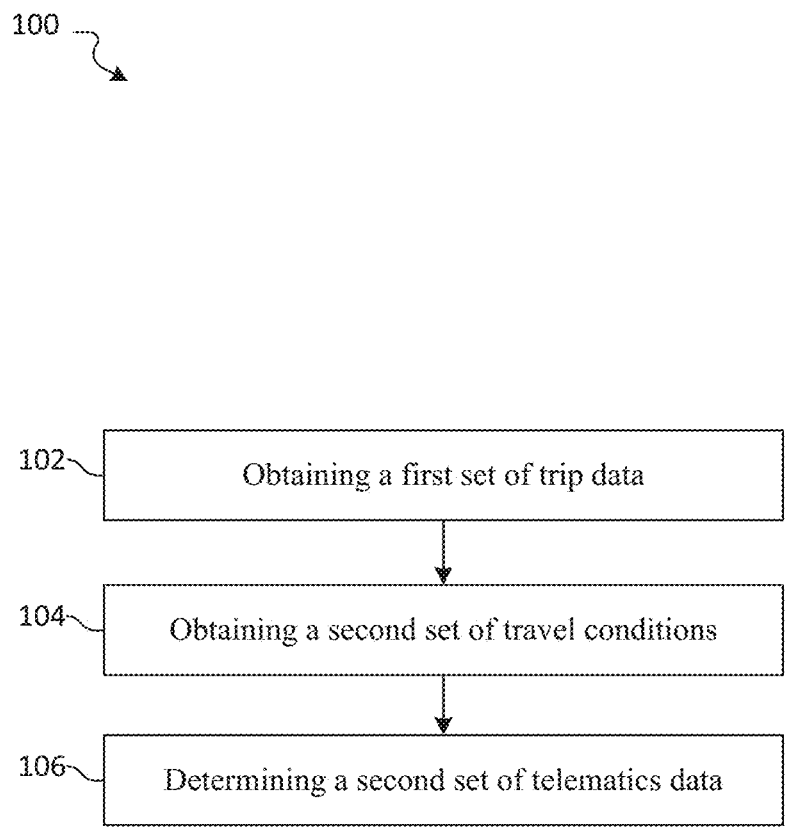
FIG. 1 is a simplified diagram showing a computer-implemented method for predicting trip data according to various embodiments of the present disclosure.

FIG. 1 is a simplified diagram showing a computer-implemented method for predicting trip data according to various embodiments of the present disclosure. This figure is merely an example, which should not unduly limit the scope of the claims. One of ordinary skill in the art would recognize many variations, alternatives, and modifications. Method 100 includes process 102 of obtaining a first set of trip data, process 104 of obtaining a second set of travel conditions, and process 106 of determining a second set of telematics data. Although the above has been shown using a selected group of operations for the method, there can be many alternatives, modifications, and variations. In some examples, some of the operations may be expanded and/or combined. Other operations may be inserted to those noted above. Depending upon the embodiment, the sequence of operations may be interchanged with others replaced. In some examples, some or all operations of the method are performed by a computing system or a processor directed by instructions stored in memory. As an example, some or all operations of the method are performed according to instructions stored in a non-transitory computer-readable medium.

In various embodiments, process 102 includes obtaining a first set of trip data associated with a first set of vehicular trips operated by a vehicle operator during a first time period. In various examples, the first set of trip data including a first set of telematics data and/or a first set of travel conditions. In some examples, the first set of operation behaviors includes acceleration characteristics, braking characteristics, steering characteristics, and/or focus characteristics. In some examples, the first set of travel conditions includes weather conditions, route conditions, route difficulties, lighting conditions, visibility conditions, or focus conditions. In certain examples, the target trip is an occurred trip or a planned trip.

In various embodiments, process 104 includes obtaining a second set of travel conditions associated with a second set of vehicular trips associated with a second time period separate from the first time period. In some examples, the second set of travel conditions includes weather conditions, route conditions, route difficulties, lighting conditions, visibility conditions, or focus conditions.

In various embodiments, process 106 includes determining a second set of telematics data associated with a target vehicular trip based at least in part upon the first set of telematics data, the first set of travel conditions, and/or the second set of travel conditions. In some examples, the second set of telematics data include time series data and location data. In some examples, the second set of operation behaviors includes acceleration characteristics, braking characteristics, steering characteristics, and/or focus characteristics.

In some embodiments, method 100 further includes: identifying a first set of matching conditions shared between the first set of travel conditions and the second set of travel conditions; identifying a first set of condition-specific telematics data from the first set of telematics data based at least in part upon the first set of matching conditions; and assigning a primary weight to each telematics data of the first set of telematics data such that higher primary weights are assigned to the first set of condition-specific telematics data. In some examples, process 106 of determining a second set of telematics data is further based upon the assigned primary weights of the first set of telematics data. In certain examples, the primary weight for non-condition-specific telematics data is zero such that they are not used in determining the second set of telematics data.

In some embodiments, method 100 further includes assigning a primary weight to each telematics data of the first set of telematics data based at least in part upon the amount of the associated travel conditions of the first set of travel conditions match with the second set of travel conditions. In various examples, the primary weight is positively proportional to the number of conditions matched. In certain examples, process 106 of determining a second set of telematics data is further based upon the assigned primary weights of the first set of telematics data.

In some embodiments, method 100 further includes assigning a secondary weight to each telematics data of the first set of telematics data based at least in part upon how close in time the associated vehicular trip is to the target vehicular trip. In some examples, process 106 of determining a second set of telematics data is further based upon the assigned secondary weights of the first set of telematics data. In certain examples, the secondary weight is higher when the associated vehicular trip is closer to the target vehicular trip in time and lower when the associated vehicular trip is farther from the target vehicular trip in time. In certain examples, the secondary weight is higher when the day of week of the vehicular trip is closer to the day of week of the target vehicular trip and lower when the day of week of the vehicular trip is farther from the day of week of the target vehicular trip.

In some embodiments, method 100 further includes assigning a tertiary weight to each telematics data of the first set of telematics data based at least in part upon a set of behavioral ratings of importance. In some examples, process 106 of determining a second set of telematics data is further based upon the assigned tertiary weights of the first set of telematics data.

In some embodiments, method 100 further includes: determining a first set of operation behaviors based at least in part upon the first set of telematics data; and determining a second set of operation behaviors based at least in part upon the first set of telematics data. In some examples, process 106 of determining a second set of telematics data is further based upon the second set of operation behaviors.

In some embodiments, method 100 further includes, when the target trip is an occurred trip, further comprising: identifying a data gap based at least in part upon a continuity of the obtained first set of trip data; and identifying the second time period and the target trip based at least in part upon the data gap. In certain examples, method 100 further includes determining whether the second time period exceeds a predetermined duration threshold. In some examples, process 106 of determining a second set of telematics data occurs after determining the duration of travel exceeds the predetermined duration threshold.

In some embodiments, method 100 further includes presenting the second set of telematics data to a user via an interactive interface. In some examples, the second set of telematics data is presented along with the second set of travel conditions.

In some embodiments, method 100 further includes: determining a set of operation behavior updates based at least in part upon the first set of telematics data and the second set of telematics data; and applying the set of operation behavior updates to an operator profile. In certain examples, method 100 further includes: determining a policy premium update based at least in part upon the set of operation behavior updates; and applying the policy premium update to the operator profile.

One or More Methods for Predicting Trip Data According to Some Embodiments

Figure 2:
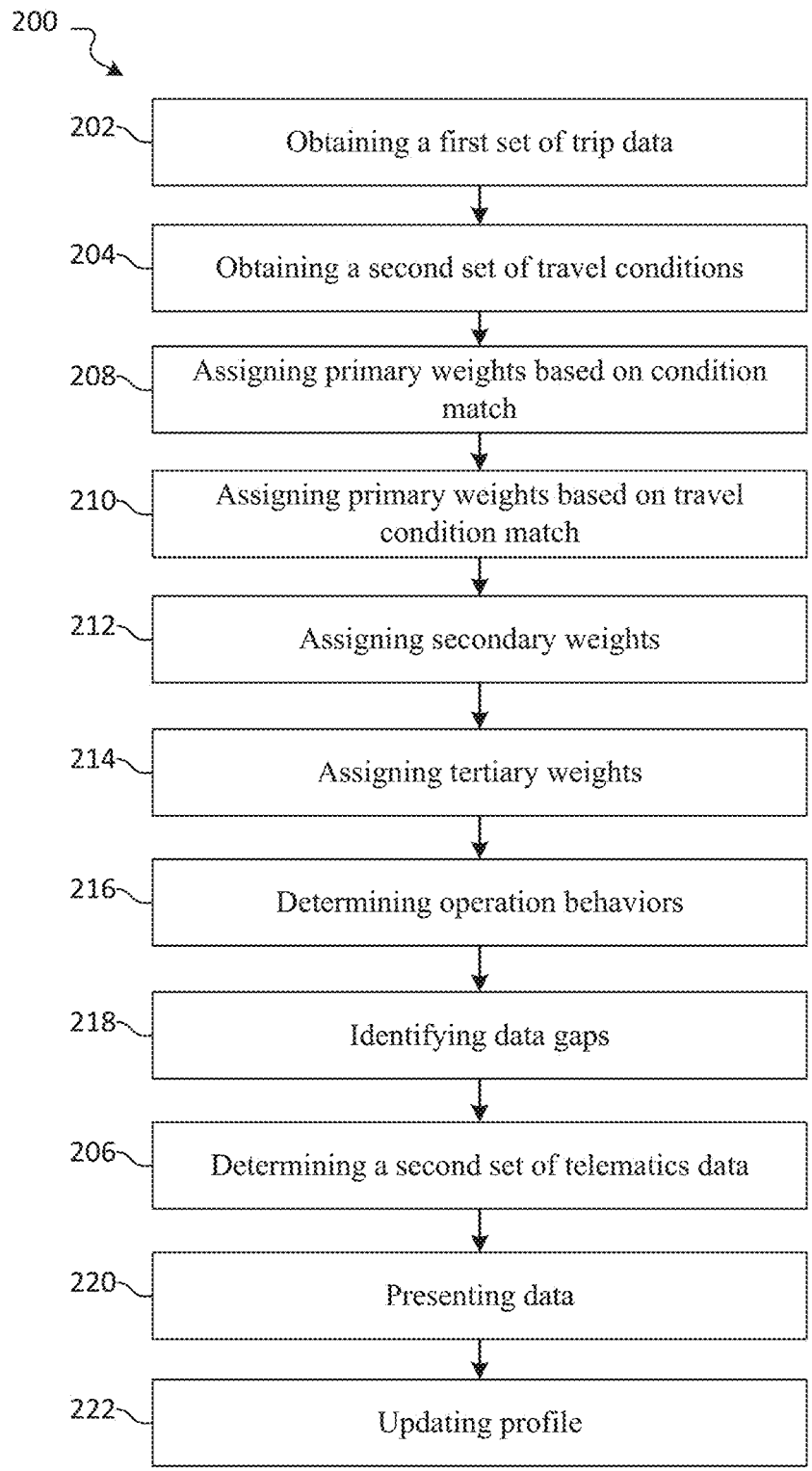
FIG. 2 is a simplified diagram showing a computer-implemented method for predicting trip data according to various embodiments of the present disclosure.

FIG. 2 is a simplified diagram showing a computer-implemented method for predicting trip data according to various embodiments of the present disclosure. This figure is merely an example, which should not unduly limit the scope of the claims. One of ordinary skill in the art would recognize many variations, alternatives, and modifications. Method 200 includes process 202 of obtaining a first set of trip data, process 204 of obtaining a second set of travel conditions, and process 206 of determining a second set of telematics data. Although the above has been shown using a selected group of operations for the method, there can be many alternatives, modifications, and variations. In some examples, some of the operations may be expanded and/or combined. Other operations may be inserted to those noted above. Depending upon the embodiment, the sequence of operations may be interchanged with others replaced. In some examples, some or all operations of the method are performed by a computing system or a processor directed by instructions stored in memory. As an example, some or all operations of the method are performed according to instructions stored in a non-transitory computer-readable medium.

In various embodiments, process 202 includes obtaining a first set of trip data associated with a first set of vehicular trips operated by a vehicle operator during a first time period. In various examples, the first set of trip data including a first set of telematics data and/or a first set of travel conditions. In some examples, the first set of operation behaviors includes acceleration characteristics, braking characteristics, steering characteristics, and/or focus characteristics. In some examples, the first set of travel conditions includes weather conditions, route conditions, route difficulties, lighting conditions, visibility conditions, or focus conditions. In certain examples, the target trip is an occurred trip or a planned trip.

In various embodiments, process 204 includes obtaining a second set of travel conditions associated with a second set of vehicular trips associated with a second time period separate from the first time period. In some examples, the second set of travel conditions includes weather conditions, route conditions, route difficulties, lighting conditions, visibility conditions, or focus conditions.

In various embodiments, process 206 includes determining a second set of telematics data associated with a target vehicular trip based at least in part upon the first set of telematics data, the first set of travel conditions, and/or the second set of travel conditions. In some examples, the second set of telematics data include time series data and location data. In some examples, the second set of operation behaviors includes acceleration characteristics, braking characteristics, steering characteristics, and/or focus characteristics.

In some embodiments, method 200 further includes process 208 of assigning primary weights based on condition match. In various examples, process 208 includes identifying a first set of matching conditions shared between the first set of travel conditions and the second set of travel conditions; identifying a first set of condition-specific telematics data from the first set of telematics data based at least in part upon the first set of matching conditions; and assigning a primary weight to each telematics data of the first set of telematics data such that higher primary weights are assigned to the first set of condition-specific telematics data. In some examples, process 206 of determining a second set of telematics data is further based upon the assigned primary weights of the first set of telematics data. In certain examples, the primary weight for non-condition-specific telematics data is zero such that they are not used in determining the second set of telematics data.

In some embodiments, method 200 further includes process 210 of assigning primary weights based on travel condition match. In some examples, process 210 includes assigning a primary weight to each telematics data of the first set of telematics data based at least in part upon the amount of the associated travel conditions of the first set of travel conditions match with the second set of travel conditions. In various examples, the primary weight is positively proportional to the number of conditions matched. In certain examples, process 206 of determining a second set of telematics data is further based upon the assigned primary weights of the first set of telematics data.

In some embodiments, method 200 further includes process 212 of assigning secondary weights. In various examples, process 212 includes assigning a secondary weight to each telematics data of the first set of telematics data based at least in part upon how close in time the associated vehicular trip is to the target vehicular trip. In some examples, process 206 of determining a second set of telematics data is further based upon the assigned secondary weights of the first set of telematics data. In certain examples, the secondary weight is higher when the associated vehicular trip is closer to the target vehicular trip in time and lower when the associated vehicular trip is farther from the target vehicular trip in time. In certain examples, the secondary weight is higher when the day of week of the vehicular trip is closer to the day of week of the target vehicular trip and lower when the day of week of the vehicular trip is farther from the day of week of the target vehicular trip.

In some embodiments, method 200 further includes process 214 of assigning tertiary weights. In some examples, process 214 includes assigning a tertiary weight to each telematics data of the first set of telematics data based at least in part upon a set of behavioral ratings of importance. In some examples, process 206 of determining a second set of telematics data is further based upon the assigned tertiary weights of the first set of telematics data.

In some embodiments, method 200 further includes process 216 of determining operation behaviors. In some examples, process 216 includes: determining a first set of operation behaviors based at least in part upon the first set of telematics data; and determining a second set of operation behaviors based at least in part upon the first set of telematics data. In some examples, process 206 of determining a second set of telematics data is further based upon the second set of operation behaviors.

In some embodiments, method 200 further includes process 218 of identifying data gaps. In some examples, process 218 includes, when the target trip is an occurred trip, identifying a data gap based at least in part upon a continuity of the obtained first set of trip data; and identifying the second time period and the target trip based at least in part upon the data gap. In certain examples, method 200 further includes determining whether the second time period exceeds a predetermined duration threshold. In some examples, process 206 of determining a second set of telematics data occurs after determining the duration of travel exceeds the predetermined duration threshold.

In some embodiments, method 200 further includes process 220 of presenting data. In some examples, process 220 includes presenting the second set of telematics data to a user via an interactive interface. In some examples, the second set of telematics data is presented along with the second set of travel conditions.

In some embodiments, method 200 further includes process 222 of updating profile. In some examples, process 222 includes: determining a set of operation behavior updates based at least in part upon the first set of telematics data and the second set of telematics data; and applying the set of operation behavior updates to an operator profile. In certain examples, method 200 further includes: determining a policy premium update based at least in part upon the set of operation behavior updates; and applying the policy premium update to the operator profile.

One or More Computing Devices According to Various Embodiments

Figure 3:
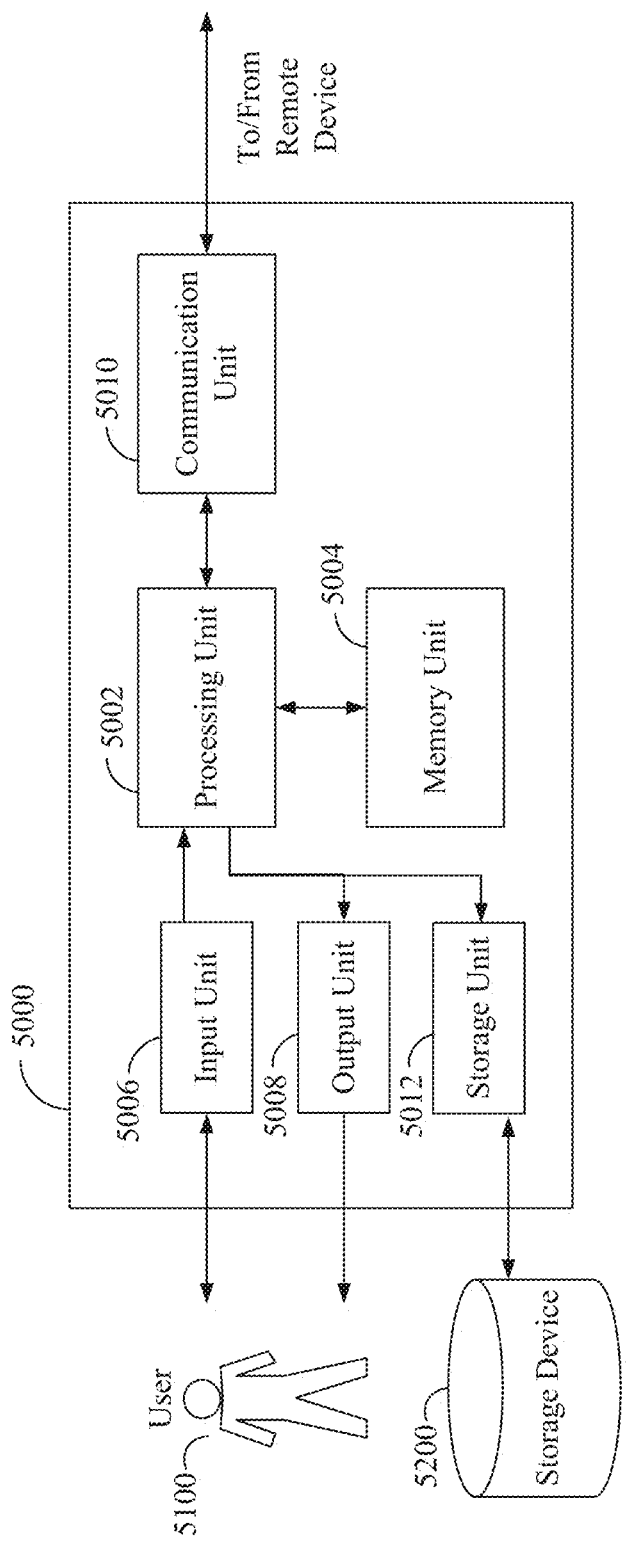
FIG. 3 is a simplified diagram showing a computing device, according to various embodiments of the present disclosure.

FIG. 3 is a simplified diagram showing a computing device 5000, according to various embodiments of the present disclosure. This figure is merely an example, which should not unduly limit the scope of the claims. One of ordinary skill in the art would recognize many variations, alternatives, and modifications. In some examples, the computing device 5000 includes a processing unit 5002, a memory unit 5004, an input unit 5006, an output unit 5008, and a communication unit 5010. In various examples, the computing device 5000 is configured to be in communication with a user 5100 and/or a storage device 5200. In certain examples, the system computing device 5000 is configured to implement method 100 of FIG. 1. Although the above has been shown using a selected group of components, there can be many alternatives, modifications, and variations. In some examples, some of the components may be expanded and/or combined. Some components may be removed. Other components may be inserted to those noted above. Depending upon the embodiment, the arrangement of components may be interchanged with others replaced.

In various embodiments, the processing unit 5002 is configured for executing instructions, such as instructions to implement method 100 of FIG. 1. In some embodiments, executable instructions may be stored in the memory unit 5004. In some examples, the processing unit 5002 includes one or more processing units (e.g., in a multi-core configuration). In certain examples, the processing unit 5002 includes and/or is communicatively coupled to one or more modules for implementing the systems and methods described in the present disclosure. In some examples, the processing unit 5002 is configured to execute instructions within one or more operating systems, such as UNIX, LINUX, Microsoft Windows®, etc. In certain examples, upon initiation of a computer-implemented method, one or more instructions is executed during initialization. In some examples, one or more operations is executed to perform one or more operations described herein. In certain examples, an operation may be general or specific to a particular programming language (e.g., C, C #, C++, Java, or other suitable programming languages, etc.). In various examples, the processing unit 5002 is configured to be operatively coupled to the storage device 5200, such as via an on-board storage unit 5012.

In various embodiments, the memory unit 5004 includes a device allowing information, such as executable instructions and/or other data to be stored and retrieved. In some examples, memory unit 5004 includes one or more computer readable media. In some embodiments, stored in memory unit 5004 include computer readable instructions for providing a user interface, such as to the user 5004, via the output unit 5008. In some examples, a user interface includes a web browser and/or a client application. In various examples, a web browser enables one or more users, such as the user 5004, to display and/or interact with media and/or other information embedded on a web page and/or a website. In certain examples, the memory unit 5004 include computer readable instructions for receiving and processing an input, such as from the user 5004, via the input unit 5006. In certain examples, the memory unit 5004 includes random access memory (RAM) such as dynamic RAM (DRAM) or static RAM (SRAM), read-only memory (ROM), erasable programmable read-only memory (EPROM), electrically erasable programmable read-only memory (EEPROM), and/or non-volatile RAM (NVRAN).

In various embodiments, the input unit 5006 is configured to receive input, such as from the user 5004. In some examples, the input unit 5006 includes a keyboard, a pointing device, a mouse, a stylus, a touch sensitive panel (e.g., a touch pad or a touch screen), a gyroscope, an accelerometer, a position detector (e.g., a Global Positioning System), and/or an audio input device. In certain examples, the input unit 5006, such as a touch screen of the input unit, is configured to function as both the input unit and the output unit.

In various embodiments, the output unit 5008 includes a media output unit configured to present information to the user 5004. In some embodiments, the output unit 5008 includes any component capable of conveying information to the user 5004. In certain embodiments, the output unit 5008 includes an output adapter, such as a video adapter and/or an audio adapter. In various examples, the output unit 5008, such as an output adapter of the output unit, is operatively coupled to the processing unit 5002 and/or operatively coupled to an presenting device configured to present the information to the user, such as via a visual display device (e.g., a liquid crystal display (LCD), a light emitting diode (LED) display, an organic light emitting diode (OLED) display, a cathode ray tube (CRT) display, an "electronic ink" display, a projected display, etc.) or an audio display device (e.g., a speaker arrangement or headphones).

In various embodiments, the communication unit 5010 is configured to be communicatively coupled to a remote device. In some examples, the communication unit 5010 includes a wired network adapter, a wireless network adapter, a wireless data transceiver for use with a mobile phone network (e.g., Global System for Mobile communications (GSM), 3G, 4G, 5G, NFC, or Bluetooth), and/or other mobile data networks (e.g., Worldwide Interoperability for Microwave Access (WIMAX)). In certain examples, other types of short-range or long-range networks may be used. In some examples, the communication unit 5010 is configured to provide email integration for communicating data between a server and one or more clients.

In various embodiments, the storage unit 5012 is configured to enable communication between the computing device 5000, such as via the processing unit 5002, and an external storage device 5200. In some examples, the storage unit 5012 is a storage interface. In certain examples, the storage interface is any component capable of providing the processing unit 5002 with access to the storage device 5200. In various examples, the storage unit 5012 includes an Advanced Technology Attachment (ATA) adapter, a Serial ATA (SATA) adapter, a Small Computing system Interface (SCSI) adapter, a RAID controller, a SAN adapter, a network adapter, and/or any other component capable of providing the processing unit 5002 with access to the storage device 5200.

In some examples, the storage device 5200 includes any computer-operated hardware suitable for storing and/or retrieving data. In certain examples, storage device 5200 is integrated in the computing device 5000. In some examples, the storage device 5200 includes a database, such as a local database or a cloud database. In certain examples, the storage device 5200 includes one or more hard disk drives. In various examples, the storage device is external and is configured to be accessed by a plurality of server systems. In certain examples, the storage device includes multiple storage units such as hard disks or solid-state disks in a redundant array of inexpensive disks (RAID) configuration. In some examples, the storage device 5200 includes a storage area network (SAN) and/or a network attached storage (NAS) system.

One or More Computing Systems According to Various Embodiments

Figure 4:
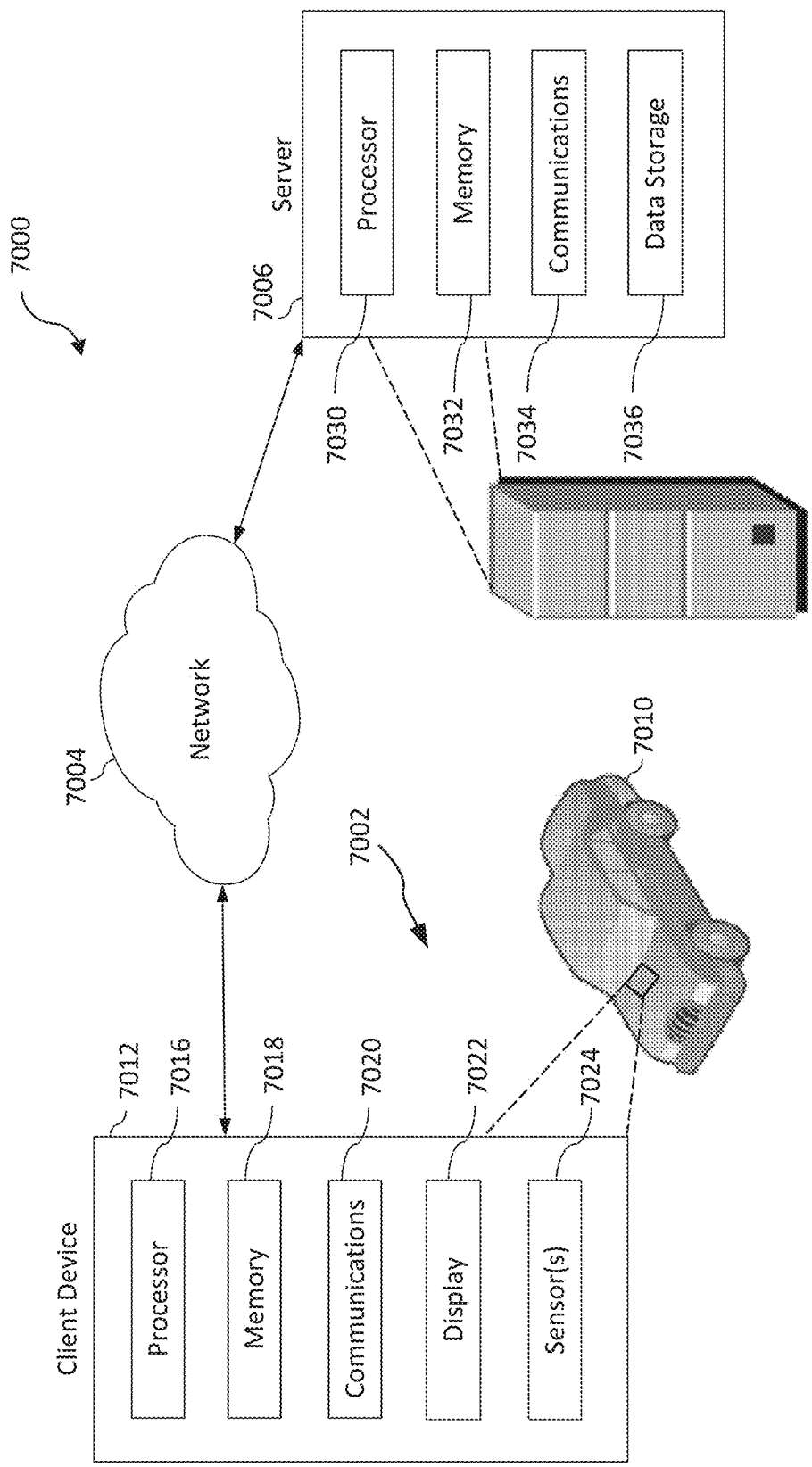
FIG. 4 is a simplified diagram showing a computing system, according to various embodiments of the present disclosure.

FIG. 4 is a simplified computing system 7000 according to various embodiments of the present disclosure. This figure is merely an example, which should not unduly limit the scope of the claims. One of ordinary skill in the art would recognize many variations, alternatives, and modifications. In some examples, the system 7000 includes a vehicle system 7002, a network 7004, and a server 7006. In certain examples, the system 7000, the vehicle system 7002, and/or the server 7006 is configured to implement method 100 of FIG. 1. Although the above has been shown using a selected group of components, there can be many alternatives, modifications, and variations. In some examples, some of the components may be expanded and/or combined. Some components may be removed. Other components may be inserted to those noted above. Depending upon the embodiment, the arrangement of components may be interchanged with others replaced.

In various embodiments, the vehicle system 7002 includes a vehicle 7010 and a client device 7012 associated with the vehicle 7010. In various examples, the client device 7012 is an on-board computer embedded or located in the vehicle 7010. As an example, the client device 7012 is a mobile device (e.g., a smartphone) that is connected (e.g., via a wired connection or a wireless connection) to the vehicle 7010. In some examples, the client device 7012 includes a processor 7016 (e.g., a central processing unit (CPU), and/or a graphics processing unit (GPU)), a memory 7018 (e.g., storage unit, random-access memory (RAM), and/or read-only memory (ROM), flash memory), a communications unit 7020 (e.g., a network transceiver), a display unit 7022 (e.g., a touchscreen), and one or more sensors 7024 (e.g., an accelerometer, a gyroscope, a magnetometer, and/or a GPS sensor).

In various embodiments, the vehicle 7010 is operated by a user. In certain embodiments, the system 7000 includes multiple vehicles 7010, each vehicle of the multiple vehicles operated by a respective user of multiple users. In various examples, the one or more sensors 7024 monitors, during one or more vehicle trips, the vehicle 7010 by at least collecting data associated with one or more operating parameters of the vehicle, such as speed, speeding, braking, location, engine status, and/or other suitable parameters. In certain examples, the collected data include vehicle telematics data. According to some embodiments, the data are collected continuously, at predetermined time intervals, and/or based upon one or more triggering events (e.g., when a sensor has acquired measurements greater than a threshold amount of sensor measurements). In various examples, the data collected by the one or more sensors 7024 correspond to user driving data, which may correspond to a driver's driving behaviors, in the methods and/or systems of the present disclosure.

According to various embodiments, the collected data are stored in the memory 7018 before being transmitted to the server 7006 using the communications unit 7020 via the network 7004 (e.g., via a local area network (LAN), a wide area network (WAN), or the Internet). In some examples, the collected data are transmitted directly to the server 7006 via the network 7004. In certain examples, the collected data are transmitted to the server 7006 via a third party. In some examples, a data monitoring system, managed or operated by a third party, is configured to store data collected by the one or more sensors 7024 and to transmit such data to the server 7006 via the network 7004 or a different network.

According to various embodiments, the server 7006 includes a processor 7030 (e.g., a microprocessor, a microcontroller), a memory 7032 (e.g., a storage unit), a communications unit 7034 (e.g., a network transceiver), and a data storage 7036 (e.g., one or more databases). In some examples, the server 7006 is a single server, while in certain embodiments, the server 7006 includes a plurality of servers with distributed processing and/or storage. In certain examples, the data storage 7036 is part of the server 7006, such as coupled via a network (e.g., the network 7004). In some examples, data, such as processed data and/or results, may be transmitted from the data storage, such as via the communications unit 7034, the network 7004, and/or the communications unit 7020, to the client device 7012, such as for display by the display 7022.

In some examples, the server 7006 includes various software applications stored in the memory 7032 and executable by the processor 7030. In some examples, these software applications include specific programs, routines, and/or scripts for performing functions associated with the methods of the present disclosure. In certain examples, the software applications include general-purpose software applications for data processing, network communication, database management, web server operation, and/or other functions typically performed by a server. In various examples, the server 7006 is configured to receive, such as via the network 7004 and via the communications unit 7034, the data collected by the one or more sensors 7024 from the client device 7012 and stores the data in the data storage 7036. In some examples, the server 7006 is further configured to process, via the processor 7030, the data to perform one or more operations of the methods of the present disclosure.

Examples of Some Embodiments of the Present Disclosure

Aspects of the present disclosure relate to systems and methods for determining fair scoring with inconsistent data.

Aspects of the present disclosure relate to systems and methods for imputing expected trip data based at least in part upon historical data. In such embodiments, the historical data of the user may be analyzed to determine one or more past trips taken during the first time period and driving behavior of the user during the one or more past trips. The historical data my include a total time of driving, a total number of trips, and/or a total number of braking events occurred during the first time period. Based at least in part upon the analysis of the historical data, the expected trip data of one or more trips that may have been taken by the user during the second time period may be imputed or predicted. In certain examples, the expected trip data includes one or more expected trips that would have been made by the user during the second time period and driving behavior of the user during the one or more expected trips. As an example, the expected trip data imputation may be based upon unsupervised and/or supervised machine learning.

As an example, the first time period may be the past 30 days before the start of the second time period, such that the historical telematics data that was collected during the past 30 days before the start of the second time period may be analyzed to impute the expected trip data. In some embodiments, the first time period may be during a particular time of the day (e.g., morning, afternoon, evening), a particular day of the week, and/or a particular month of the year, in which the particular time of the day, the particular day of the week, and/or a particular month of the year is the same as the time of day, the day of the week, and/or the month of the year of the second time period during which telematics data was not recorded. In certain embodiments, the first time period may be a particular season in the last year, in which the particular season is the same as the season that the second time period is in in the current year. In some embodiments, the first time period may be selected based at least in part upon a particular weather condition. For example, the first time period may have a particular weather condition, in which the particular weather condition is the substantially similar as the weather condition during the second time period. In some examples, the first time period may be selected, such that one or more features are substantially similar to one or more features of the second time period. It should be appreciated that, in some embodiments, the first time period may include multiple segments of time durations.

According to certain embodiments, a system and/or a method for imputing one or more expected trips that would have been made by a user includes: collecting historical data of a user during a first time period, wherein the historical data includes telematics data of the user; analyzing the telematics data to determine one or more past trips made by the user during the first time period and driving behavior of the user during the one or more past trips; determining a second time period during which telematics data has not been recorded, the second time period being subsequent to the first time period; and determining expected trip data that would have been generated by the user during the second time period based at least in part upon the historical data. In certain examples, determining expected trip data includes determining one or more expected trips made by the user during the second time period based at least in part upon the historical data, and determining expected driving behavior of the user during the one or more expected trips based at least in part upon the historical data.

Aspects of the present disclosure relate to systems and methods for determining driving behavior of a user during one or more gap periods by equally weighing telematics data. According to some embodiments, a system and/or a method for determining driving behavior of a user with one or more gap periods is disclosed. The gap period may be a time period during which telematics data has not been collected or recorded by the user in a past predetermined time period. In certain examples, the gap period may fall between first and second time periods during which telematics data were collected. In certain examples, an application running on a mobile device of the user may be configured to collect telematics data. In certain examples, the telematics data may be recorded or stored in the application and/or transmitted to a server. In certain examples, the telematics data may not have been collected during the gap period if the application malfunctioned during the gap period or the application was not turned on during the gap period. In certain examples, this may result in a gap in the telematics data of the user.

According to some embodiments, in response to detecting the gap in the telematics data of the user, the telematics data collected during the predetermined time period may be analyzed to determine if an amount of the telematics data exceeds a predetermined amount of telematics data. In certain examples, the telematics data may be analyzed to determine if a total number of days that the telematics data was collected during a predetermined time period (e.g., past 30 days) exceeds a predetermined threshold (e.g., 28 days). In certain examples, if the amount of the telematics data exceeds the predetermined amount of telematics data, the gap in the telematics data may be ignored.

In certain examples, if the amount of telematics data does not exceed the predetermined amount of telematics data, telematics data that would have been collected during the gap period may be imputed or predicted. In certain examples, gap telematics data representing telematics data that would have been collected or recorded during the gap period may be imputed or predicted in order to generate user's driving data for the last 28 consecutive days, which may be used to determine the driving behavior of the user.

In certain embodiments, the telematics data that was collected during a predetermined non-consecutive time period (e.g., 28 non-consecutive days) may be used to determine the driving behavior of the user. In certain examples, the user's driving data for past 28 days may be created by selecting telematics data that was collected during the past 4 Mondays, 4 Tuesday, 4 Wednesday, 4 Thursday, 4 Fridays, 4 Saturdays, and 4 Sundays. As an example, 4 Mondays may not be 4 consecutive Mondays. In such example, the telematics data for each day of the week may have equal weight. In another example, each day of the week is weighted equally. For example, in the past 12 weeks, if telematics data were collected on 10 past non-consecutive Mondays and 4 past non-consecutive Saturdays, then each Monday telematics data is worth 10% of the overall Mondays telematics data, whereas each Saturday telematics data is worth 25% of the overall Saturday telematics data.

According to certain embodiments, a system and/or a method for determining driving behavior of a user with one or more gap periods includes: collecting telematics data for a first predetermined time period; detecting the one or more gap periods during which telematics data has not been collected or recorded by the user based at least in part upon the collected telematics data; in response to detecting the one or more gap periods, determining whether the collected telematics data satisfies one or more predetermined conditions; and in response to determining that the collected telematics data satisfies the one or more predetermined conditions, for each gap period, equally weighing at least some of the collected telematics data based in part upon a particular day of the week that corresponds to the gap period to generate driving data reflective of driving behavior of the user during the gap period.

Aspects of the present disclosure relate to systems and methods for determining driving behavior of a user during one or more gap periods by proportionally weighing telematics data. According to some embodiments, a system and/or a method for determining driving behavior of a user with one or more gap periods is disclosed. In certain examples, the gap period is a time period during which telematics data has not been collected or recorded by the user in a past predetermined time period. In certain examples, the gap period falls between first and second time periods during which telematics data were collected. In certain examples, an application running on a mobile device of the user is configured to collect telematics data. In certain examples, the telematics data may be recorded or stored in the application and/or transmitted to a server. According to certain embodiments, the telematics data may not have been collected during the gap period if the application malfunctioned during the gap period or the application was not turned on during the gap period. In certain examples, this may result in a gap in the telematics data of the user.

According to some embodiments, in response to detecting the gap in the telematics data of the user, the telematics data collected during the predetermined time period is analyzed to determine if an amount of the telematics data exceeds a predetermined amount of telematics data. For example, the telematics data is analyzed to determine if a total number of days that the telematics data was collected during a predetermined time period (e.g., past 30 days) exceeds a predetermined threshold (e.g., 28 days). In certain examples, if the amount of the telematics data exceeds the predetermined amount of telematics data, the gap in the telematics data may be ignored.

In certain examples, if the amount of telematics data does not exceed the predetermined amount of telematics data, telematics data that would have been collected during the gap period may be imputed or predicted. In certain examples, gap telematics data representing telematics data that would have been collected or recorded during the gap period is imputed or predicted in order to generate user's driving data for the last 28 consecutive days, which may be used to determine the driving behavior of the user.

In certain examples, the telematics data that was collected during a predetermined non-consecutive time period (e.g., 28 non-consecutive days) may be used to determine the driving behavior of the user. For example, the user's driving data for past 28 days may be created by selecting telematics data that was collected during the past 4 Mondays, 4 Tuesday, 4 Wednesday, 4 Thursday, 4 Fridays, 4 Saturdays, and 4 Sundays. As an example, 4 Mondays may be not 4 consecutive Mondays. In certain examples, the telematics data collected on each day of the week may be weighted differently depending on the amount of telematics data collected for each day of the week (e.g., proportionally scaling the telematics data collected on each of the day). In certain examples, the gap period is analyzed to determine if the user has a pattern of turning off the mobile device or the telematics application on the mobile device, thereby creating a gap in the telematics data of the user. In certain examples, if the user has a pattern of turning off the mobile device on Saturdays thereby generating less telematics data collected on Saturdays compared to, for example, Mondays, the telematics data for each Saturdays may weigh more than the telematics data for each Mondays. In certain examples, in the past 12 weeks, if telematics data was collected on 4 past non-consecutive Saturdays, then each Saturday telematics data may be weighted unequally. In certain examples, more recent Saturday telematics data may be worth more than more distant past Saturday telematics data. In certain examples, the weight of each Saturday telematics data may linearly decrease with ranking—1st Saturday (most recent) is worth 40%, 2nd Saturday is worth 25%; 3rd Saturday is worth 20%; 4th Saturday (most distant) is worth 15%. In certain examples, weights are linearly decreasing with lapse of time.

According to certain embodiments, a system and/or a method for determining driving behavior of a user with one or more gap periods includes: collecting telematics data for a first predetermined time period; detecting the one or more gap periods during which telematics data has not been collected or recorded by the user based at least in part upon the collected telematics data; in response to detecting the one or more gap periods, determining whether the collected telematics data satisfies one or more predetermined conditions; and in response to determining that the collected telematics data satisfies the one or more predetermined conditions, for each gap period, unequally weighing at least some of the collected telematics data based in part upon a particular day of the week that corresponds to the gap period to generate driving data reflective of driving behavior of the user during the gap period.

Aspects of the present disclosure relate to systems and methods for estimating driving stability to determine whether safety stability and usage stability are stable. According to some embodiments, a system and/or a method for estimating driving stability to determine whether safety stability and usage stability are stable is disclosed. In certain examples, telematics data of the one or more users of the vehicle is collected by an application running on one or more mobile devices of the respective users. In certain examples, the telematics data may indicate driving behavior of the one or more users and may be used to estimate a driving stability. In certain examples, the driving stability indicates whether the collected telematics data is enough to predict future driving behaviors of the one or more users associated with the vehicle. In certain examples, if the driving stability is stable to determine or predict the future driving behaviors of the one or more users, then a notification may be sent to the one or more users indicating that the one or more users may disable a data collection function of the telematics application for an indicated time period.

According to certain embodiments, the driving stability includes a safety stability and a usage stability. For example, the safety stability indicates whether driving behavior (e.g., safety driving behavior and/or mindful driving) is stable over a first predetermined time period, and the usage stability indicates whether a usage of the vehicle is stable over a second predetermined time period. As an example, the safety driving behavior is stable if an average driving behavior is constant over the first predetermined time period. In certain examples, the usage of the vehicle is stable if an average usage of the vehicle (e.g., an average mileage per week or month) is constant over the second predetermined time period. In some embodiments, even if the average usage of the vehicle fluctuates week by week or month by month, if the usage of the vehicle fluctuates regularly (e.g., ascertainable pattern of the usage) over the second predetermined time period, then the usage of the vehicle is said to be stable. It should be appreciated that, in some embodiments, the first predetermined time period and the second predetermined time period may be the same.

According to certain embodiment, if one stability component is stable but if the other stability component is unstable, then the one or more users are notified to collect more data of only the unstable component. As an example, if the driving behavior is stable but the amount of the driving fluctuates irregularly, then the one or more users is notified that the one or more users do not need to collect more telematics data for a certain time period but is required to periodically record an odometer reading. For example, the one or more users may be periodically notified to manually enter the odometer reading (e.g., by typing the odometer reading or taking a photo of the odometer) in the telematics application.

According to certain embodiments, a system and/or a method for estimating a driving stability of one or more users of a vehicle includes: collecting telematics data of the one or more users of the vehicle; determining a driving stability based at least in part upon the collected telematics data, the driving stability including a safety stability and a usage stability; determining whether the safety stability and the usage stability are stable; in response to determining that both of the safety stability and the usage stability are stable, notifying the one or more users that no further telematics data is needed for a predetermined time period; and in response to determining that the safety stability and/or the usage stability is unstable, notifying the one or more users to collect additional telematics data of the vehicle for the safety stability and/or the usage stability.

Aspects of the present disclosure relate to systems and methods for estimating driving stability to determine whether safety stability is stable. According to certain embodiments, a system and/or a method for estimating a driving stability of one or more users of a vehicle includes: collecting telematics data of the one or more users of the vehicle; determining a driving stability based at least in part upon the collected telematic data, the driving stability including a safety stability; determining whether the safety stability is stable; in response to determining that the safety stability is stable, notifying the one or more users that no further telematics data is needed for a predetermined time period; and in response to determining that the safety stability is unstable, notifying the one or more users to collect additional telematics data of the vehicle for the safety stability.

Aspects of the present disclosure relate to systems and methods for estimating driving stability to determine whether usage stability is stable. According to certain embodiments, a system and/or a method for estimating a driving stability of one or more users of a vehicle includes: collecting telematics data of the one or more users of the vehicle; determining a driving stability based at least in part upon the collected telematic data, the driving stability including a safety stability and a usage stability; determining whether the safety stability and the usage stability are stable; and in response to determining that the safety stability is stable but the usage stability is unstable, notifying the one or more users that no further telematics data for the safety stability is needed and also notifying the one or more users to periodically submit an odometer reading of the vehicle.

Aspects of the present disclosure relate to systems and methods for dynamically adjusting insurance discount. According to some embodiments, a system and/or a method for dynamically adjusting an insurance discount of a customer an early discount estimation is disclosed. For example, if a new customer requests for a vehicle insurance policy and gets approved for the vehicle insurance policy, a predetermined initial driving discount may be offered to the customer for downloading a telematics application on a mobile device that is configured to collect telematics data. In various examples, this allows the customer to take advantage of a driving discount from the start of the vehicle insurance policy, instead of waiting until the customer has enough telematics data to determine driving behavior of the customer to provide a driving discount. In certain examples, as telematics data of the user is collected, the driving discount of the customer is dynamically adjusted based at least in part upon the telematics data to reflect the driving behavior of the customer.

As an example, the customer may receive an initial 25% discount for downloading a telematics application on a mobile device that is configured to collect telematics data. The customer may be presented a projected next bill with 25% initial driving discount on Day 1 of getting a vehicle insurance policy. The projected next bill may represent an amount of insurance premium that the customer is expected to pay at the end of a billing cycle given that the customer continues to be eligible for 25% driving discount. As the customer takes trips, the application may collect telematics data representative of driving behavior of the customer. As the telematics data is being collected, the driving discount may be continuously or periodically adjusted based at least in part upon the telematics data to reflect the driving behavior of the customer. In some examples, at the end of the billing cycle (e.g., at the end of a month), the projected discount rate equals the actual discount rate based in part upon the actual driving behavior of the customer.

According to certain embodiments, a system and/or a method for providing an early discount estimation includes: receiving a request from a user of a vehicle for a vehicle insurance policy; determining whether the user has historical telematics data indicative of driving behavior of the user prior to the request; in response to determining that the user does not have historical telematics data, providing the vehicle insurance policy with a predetermined initial driving discount rate; collecting telematics data of the user associated with the vehicle; and dynamically updating the driving discount rate based at least in part upon the telematics data.

Aspects of the present disclosure relate to systems and methods for adjusting driving discount rate of user. According to some embodiments, a system and/or a method for adjusting a driving discount rate applied to a vehicle insurance premium is disclosed. In certain examples, telematics data of a user of the vehicle may be collected by a telematics application running on a mobile device of the user. In certain examples, the telematics data may indicate driving behavior of the user and may be used to determine a driving discount rate for a vehicle insurance premium and to estimate a driving stability. In certain examples, the driving stability may indicate whether the collected telematics data is enough to predict future driving behaviors of the user. In certain examples, if the driving stability is stable to determine or predict the future driving behaviors of the user, then a notification is sent to the user indicating that (1) the user is qualified for a driving discount rate, (2) the user may stop collecting telematics data for a certain time period, and/or (3) the user only needs to periodically record odometer readings. For example, the user may be periodically notified to manually enter the odometer reading (e.g., by typing the odometer reading or taking a photo of the odometer) in the telematics application.

According to certain embodiments, the driving discount rate may be adjusted based upon a usage of the vehicle indicated by the odometer readings. For example, once the usage of the vehicle is determined to be stable over a predetermined time period based at least in part upon the odometer readings, a notification is sent to the user indicating that (1) the user no longer needs to record the odometer readings and (2) the adjusted driving discount rate is valid for a certain time period assuming that the usage of the vehicle remains stable. For example, the usage of the vehicle is stable if an average usage of the vehicle (e.g., an average mileage per week or month) is constant over the predetermined time period.

According to some embodiments, when a claim associated with the vehicle is received from the user, the user is asked to provide an odometer reading to verify that the usage of the vehicle remained stable since receiving the last odometer reading. In certain examples, this ensures that the user is still qualified for the driving discount rate that has been applied to the insurance vehicle premium of the user. In certain examples, if the usage of the vehicle has not remained stable based upon the odometer reading taken subsequent to submitting the claim, the driving discount rate applied to the insurance premium is corrected based upon the updated usage of the vehicle. In certain examples, a deductible amount associated with the claim is also adjusted based upon the corrected driving discount rate to compensate for what the user should have paid for the vehicle insurance premium. In certain examples, a deductible amount associated with the vehicle insurance premium of the user is $500. In certain examples, based upon a new odometer reading, it is determined that the usage of the vehicle has not remained stable and that the user should have paid extra $500 in the vehicle insurance premium. Therefore, the new deductible amount applied to the vehicle insurance claim becomes $1000.

According to some embodiments, a system and/or a method for adjusting a driving discount rate includes: collecting telematics data of a user of a vehicle, the telematics data indicating driving behavior of the user; determining a safety stability based at least in part upon the collected telematic data; determining whether the safety stability is stable for a first predetermined time period; in response to determining that the safety stability is stable for the first predetermined period of time, determining a driving discount rate applied to a vehicle insurance premium, transmitting a first notification to the user indicating that the user does not need to collect the telematics data and that the user needs to periodically submit odometer readings, determining whether a usage of the vehicle is stable for a second predetermined time period based at least in part upon the submitted odometer readings; in response to determining that the usage of the vehicle is stable for the second predetermined time period, adjusting the driving discount rate, transmitting a second notification to the user indicating that the user does not need to submit additional odometer readings; receiving an insurance claim associated with the vehicle; in response to receiving the insurance claim, transmitting a third notification to the user to record a present odometer reading of the vehicle; determining whether the usage of the vehicle has remained stable based at least in part upon the present odometer reading; and in response to determining that the usage of the vehicle has not remained stable, correcting the adjusted driving discount rate and/or determining an amount of deductible applied to the insurance claim based at least in part upon the corrected driving discount rate.

Aspects of the present disclosure relate to systems and methods for providing selective trip logging. According to some embodiments, a system and/or a method for providing a selective trip logging to a user is disclosed. For example, telematics data may not be continuously collected by an application running on a mobile device of the user, but rather, telematics data may be collected based upon a triggering event. In certain examples, the application provides a selective trip logging for the user to build a driving profile of the user under a variety of conditions. For example, when there is an adverse weather event, the application may notify the user that the telematics data will be collected during the adverse weather event. In certain examples, the application may collect telematics data of different days of the week. In other words, the application provides an intentional probing or an intelligent sampling through time to collect certain telematics data of the user to adequately determine past, present, and/or future driving behavior of the user.

According to some embodiments, a system and/or a method for providing a selective trip logging includes: collecting telematics data of a user; after the telematics data of the user has been collected, detecting a triggering event; determining whether the detected triggering event satisfies one or more predetermined conditions based at least in part upon the collected telematics data of the user; in response to determining that the detected triggering event does not satisfy the one or more predetermined conditions, not collecting additional telematics data of the user when the user is driving; and in response to determining that the detected triggering event satisfies the one or more predetermined conditions, collecting additional telematics data of the user, notifying the user that the additional telematics data is being collected because of the triggering event, and updating a driving profile of the user based at least in part upon the additional telematics data.

Aspects of the present disclosure relate to systems and methods for selectively providing telematics data based in part upon decaying insurance discount. According to some embodiments, a system and/or a method for selectively providing telematics data based in part upon decaying insurance discount is disclosed. For example, a customer is offered an insurance discount by an insurance provider. In certain examples, the insurance discount will decay over time if the customer does not share telematics data of the customer collected by a telematics application running on a mobile device of the customer. In certain examples, the customer may be notified by the application as the insurance discount decreases. In certain examples, in response to receiving the notification, the user may decide whether to submit collected telematics data to the insurance provider to update the insurance discount based in part upon the collected telematics data. In certain examples, this allows the customer to control when the telematics data is being shared with the insurance provider. In certain examples, in response to submitting the telematics data, the customer receives an updated insurance discount by the insurance provider based at least in part upon the submitted telematics data.

According to some embodiments, a system and/or a method for selectively providing telematics data for an insurance discount includes: providing, by an insurance provider, a first insurance discount to a user; after the first insurance discount has been provided to the user, collecting, by a telematics application executed on a mobile device of the user, first telematics data of the user; storing the collected first telematics data of the user on the mobile device of the user without transmitting the collected first telematics data to the insurance provider for a first period of time that is determined by the user; determining a decrease of the first insurance discount of the user (e.g., the insurance discount decays, from the first insurance discount, linearly or non-linearly with time) based at least in part upon the first period of time during which the collected first telematics data of the user is not transmitted to the insurance provider; notifying the user the decrease of the first driving discount of the user;

in response to notifying the user the decrease of the first driving discount, determining whether the user wants to submit the collected first telematics data to the insurance provider; if the user wants to submit the collected first telematics data to the insurance provider, transmitting the collected first telematics data from the mobile device of the user to the insurance provider; and determining a second insurance discount (e.g., the decayed insurance discount is reset to the second insurance discount, before the insurance discount decays again, from the second insurance discount, linearly or non-linearly with time) based at least in part upon the transmitted first telematics data, the second insurance discount being equal or not equal to the first insurance discount.

Aspects of the present disclosure relate to systems and methods for selectively providing data based in part upon driving discount rate determined on mobile device of user. According to some embodiments, a system and/or a method for selectively providing data for an insurance discount is disclosed. In certain examples, some customers may prefer to have ability to control which data and how much of the data is being shared with an insurance provider. For example, telematics data collected by a telematics application running on a mobile device of a customer may be used to determine a driving discount rate for an insurance premium of the customer. According to certain embodiments, the driving discount rate is computed by the telematics application on the mobile device of the customer based at least in part upon the telematics data. In certain examples, once the driving discount rate is determined, the customer can choose whether to submit driving discount data including the driving discount to the insurance provider to claim the driving discount. In certain examples, the driving discount rate may decay over time if the customer does not submit it within a predetermined time period. In certain examples, this allows the customer to control when the data is being shared with the insurance provider, and the entire telematics data need not be shared with the insurance provider to be eligible for the driving discount. In some embodiments, the driving discount data further includes metadata. As an example, the metadata includes a decaying rate of the driving discount, which is determined based in part upon a number of trips and/or an amount of telematics data that was used to determine the driving discount.

According to some embodiments, a system and/or a method for selectively providing telematics data for an insurance discount includes: collecting, by a telematics application executed on a mobile device of a user, telematics data of the user; determining, by the telematics application, a driving discount rate based at least in part upon the telematics data; receiving instructions from the user whether to submit the driving discount rate to an insurance provider; and transmitting, in response to receiving the instructions to submit the driving discount rate, driving discount data including the driving discount rate and a decaying rate, the decaying rate indicative of how fast the discount rate decays over time and determined based upon a number of trips and/or an amount of telematics data that was used to determine the driving discount rate.

Examples of Certain Embodiments of the Present Disclosure

Aspects of the present disclosure relate to collecting, processing, and/or presenting of telematics data associated with one or more vehicular trips. In various examples, trip data may be extracted from telematics data to include time series data and location data. In some examples, trip data may be stored, processed, and/or presented in the form of raw data (e.g., where location data is in association with time data). In certain examples, trip data may be stored, processed, and/or presented in the form of feature data, which may be derived from at least the raw data. In some examples, feature data may include speed, acceleration, braking, starts, stops, cornering characteristics, and/or vehicle operator focus. One or more vehicular sensors may be used to obtain trip data, such as an accelerometer, a Global Positioning System (GPS), a gyroscope, a magnetometer, and/or a depth sensor (e.g., a camera, LIDAR, RADAR).

In various embodiments, predicted trip data may be generated based at least in part upon obtained trip data. In certain examples, predicted trip data may be associated with an actual trip that at least a portion of the obtained trip data is associated with. For example, the predicted trip data may be for a time period of an actual trip where obtained trip data do not cover, such as due to sensor failure, transmitter failure, and/or server failure. In said examples, predicted trip data may be determined based at least in part upon the trip data obtained at time periods close to the missing time segment. In certain examples, predicted trip data may be generated based at least in part upon known travel conditions and the vehicular operator's driving behaviors.

In various examples, predicted trip data may be generated for a fictitious trip, such as a trip not yet taken place, such as a planned trip in the future. In said examples, predicted trip data may be generated based at least in part upon predicted travel conditions and driver behaviors extracted from obtained trip data. In some examples, predicted travel conditions may include predicted weather conditions, predicted route conditions (e.g., maintenance level, potholes, retention rails), predicted route difficulties (e.g., how challenging is the route likely to be? How many short ramps, how many sharp curves, how many lane merges, how many multi-lane crosses?), predicted lighting conditions (e.g., angle of the sun), predicted visibility conditions (e.g., a combination score based upon weather and lighting), and/or predicted focus conditions (e.g., time of day, number of passengers, driver and/or passenger in-vehicle activities). In various examples, driver behaviors may include acceleration characteristics, braking characteristics, steering characteristics, and/or focus characteristics.

In some examples, driving condition-specific driver behaviors may be extracted from obtained data based upon one or more driving conditions of interests. As an example, a first set of driving-condition-specific driving behaviors may be determined based at least in part upon obtained trip data associated with a first weather condition (e.g., sunny), a first traffic condition (e.g., normal traffic), a first route condition (e.g., normal route complexity), and/or a first visibility condition (e.g., 50 meters). As another example, a second set of driving-condition-specific driving behaviors may be determined based at least in part upon obtained trip data associated with a second weather condition (e.g., snowy), a second traffic condition (e.g., heavy traffic), a second route condition (e.g., high route complexity), and/or a second visibility condition (e.g., 10 meters). In various examples, the predicted trip data may be determined based at least in part upon predicted travel conditions and the associated driving condition-specific driving behaviors. In certain examples, day-specific, week-specific, and/or month-specific driving behaviors may be determined and be used to predict trip data of a particular day. As an example, predicted trip data for a Monday may be determined based at least in part upon trip data obtained on past Mondays.

In various examples, the predicted trip data may be in the form of raw-data or feature data. As an example, the predicted trip data may be in the form of raw-data when the obtained data used to determine the predicted trip data are also in the form of raw-data. As another example, the predicted trip data may be in the form of feature-data when the obtained data used to determine the predicted trip data are also in the form of feature-data. In certain examples, once predicted trip data in raw data form are obtained, predicted trip data in feature data form may be generated. In certain examples, once predicted trip data in feature data form are obtained, predicted trip data in raw data form may be generated.

In various examples, predicted trip data may be determined or generated based upon obtained trip data spanning multiple time periods. In certain examples, trip data obtained in different time periods, which may be condition-specific, may be weighed equally in the determination of predicted trip data. As an example, trip data obtained in a first time period closest to the missing or planned time period of the predicted trip data may be weighed the same as trip data obtained in a second time period farther from the missing or planned time period than the first time period.

In certain examples, trip data obtained in different time periods, which may be condition-specific, may be weighed unequally in the determination of predicted trip data. As an example, trip data obtained in a first time period closest to the missing or planned time period of the predicted trip data may be weighed more than trip data obtained in a second time period farther from the missing or planned time period than the first time period.

In some examples, condition-specific trip data may be weighed more than non-condition specific trip data. As an example, trip data obtained under substantially the same travel conditions as a missing or planned trip segment in need of the predicted trip data may be weighed the most, such as more than trip data obtained under travel conditions dissimilar to the missing or planned trip segment. In some examples, the weight for trip data may be determined based at least in part upon how many trip conditions match that of the missing or planned trip segment. In certain examples, trip conditions of the missing or planned trip segment may be estimated based upon obtained trip data and/or third party information.

In various examples, a primary weight may be assigned to trip data to illustrate how closely related the travel conditions are to the missing or planned trip segment determination of predicted trip data may be. In certain examples, a secondary weight may be assigned to trip data to illustrate how close in time the travel conditions are to the missing or planned trip segment determination of predicted trip data may be. In some examples, a tertiary weight may be further assigned to trip data to illustrate how useful the trip data are in the prediction of trip data. As an example, braking data, steering data, acceleration data, and focus data may be considered most important in the prediction of trip data, more so than other telematics data that may illustrate less crucial features such as amount of stops and lane changes.

In various examples, systems and methods of the present disclosure relate to obtaining telematics data to a sufficient level and either automatically terminating obtaining of telematics data or notifying a user that the user may terminate transmission of telematics data. In some examples, the sufficient level may correlate to a level sufficient to generate a driving profile, a usage profile, and/or a safety profile. In some examples, the sufficient level may correlate to a level sufficient to generate a stable driving profile, a stable usage profile, and/or a stable safety profile. In certain examples, a stable driving profile, a stable usage profile, and/or a stable safety profile may be one with fluctuations within a predetermined degree of deviation from the established profiles. In such manners, the termination of telematics collection is not dependent on time duration but rather how well the established driving profile, usage profile, and/or safety profile describe the operator's driving characteristics. One or more fit thresholds may be used to determine when are the profiles good enough that additional collection of telematics data may only marginally improve the profiles. In certain examples, the profiles may be new profiles of new vehicular operators or updated profiles of existing vehicular operators.

In some examples, usage profile may be determined based at least in part upon travel pattern including driving distance, driving time, trip frequency, and/or route repetitiveness. In certain examples, a usage profile may be determined to be stable when newly obtained trip data associated with a new trip substantially matches the predicted trip data determined based at least in part upon the usage profile. In some examples, safety profile may be determined based at least in part upon driving characteristics.

In some examples, an initial discount may be determined and given to a new user, such as when the new user first signs up or downloads an application. In various examples, the initial discount may be determined based at least in part upon a target profitability or an average discount rate of existing users or of a group of existing users similar to the new user (e.g., in age, location, occupation, vehicle type, vehicle age). In certain examples, the initial discount is then dynamically adjusted based at least in part upon time and/or driving behaviors exhibited via newly obtained telematics data. A minimum discount rate may be set such that the initial discount rate cannot be adjusted below the minimum discount rate. In some examples, the discount rate may reduce linearly or nonlinearly (e.g., exponentially) with the passage of time. In various examples, the dynamic discount rate may change with the passage of time without collection of telematics data. In some examples, a notification threshold may be set such that, when the dynamic discount rate falls below the notification threshold, a user may be notified to provide telematics data in order to update the dynamic discount rate. In some examples, the determination of the dynamic discount rate, such as with the passage of time and/or based upon newly provided telematics data, may be done locally on a mobile device. In certain examples, only the calculated new discount rate is transmitted to a server storing policy information.

Examples of Various Aspects of the Present Disclosure

Aspect 1. A computer-implemented method for predicting trip data includes: obtaining a first set of trip data associated with a first set of vehicular trips operated by a vehicle operator during a first time period, the first set of trip data including a first set of telematics data and a first set of travel conditions; obtaining a second set of travel conditions associated with a second set of vehicular trips associated with a second time period separate from the first time period; and determining a second set of telematics data associated with a target vehicular trip based at least in part upon the first set of telematics data, the first set of travel conditions, and the second set of travel conditions. The method may be implemented according to method 100 of FIG. 1 and/or configured to be implemented by system device 5000 of FIG. 3, and/or system 7000 of FIG. 4.

Aspect 2. The computer-implemented method of aspect 1, further comprising: identifying a first set of matching conditions shared between the first set of travel conditions and the second set of travel conditions; identifying a first set of condition-specific telematics data from the first set of telematics data based at least in part upon the first set of matching conditions; assigning a primary weight to each telematics data of the first set of telematics data such that higher primary weights are assigned to the first set of condition-specific telematics data; wherein the determining a second set of telematics data is further based upon the assigned primary weights of the first set of telematics data.

Aspect 3. The computer-implemented method of aspect 2, wherein the primary weight for non-condition-specific telematics data is zero such that they are not used in determining the second set of telematics data.

Aspect 4. The computer-implemented method of aspect 1, further comprising: assigning a primary weight to each telematics data of the first set of telematics data based at least in part upon the amount of the associated travel conditions of the first set of travel conditions match with the second set of travel conditions; wherein the primary weight is positively proportional to the number of conditions matched; wherein the determining a second set of telematics data is further based upon the assigned primary weights of the first set of telematics data.

Aspect 5. The computer-implemented method of any of aspects 1-4, further comprising: assigning a secondary weight to each telematics data of the first set of telematics data based at least in part upon how close in time the associated vehicular trip is to the target vehicular trip; wherein the determining a second set of telematics data is further based upon the assigned secondary weights of the first set of telematics data.

Aspect 6. The computer-implemented method of aspect 5, wherein the secondary weight is higher when the associated vehicular trip is closer to the target vehicular trip in time and lower when the associated vehicular trip is farther from the target vehicular trip in time.

Aspect 7. The computer-implemented method of aspect 5, wherein the secondary weight is higher when the day of week of the vehicular trip is closer to the day of week of the target vehicular trip and lower when the day of week of the vehicular trip is farther from the day of week of the target vehicular trip.

Aspect 8. The computer-implemented method of any of aspects 1-7, further comprising: assigning a tertiary weight to each telematics data of the first set of telematics data based at least in part upon a set of behavioral ratings of importance; wherein the determining a second set of telematics data is further based upon the assigned tertiary weights of the first set of telematics data.

Aspect 9. The computer-implemented method of any of aspects 1-8, further comprising: determining a first set of operation behaviors based at least in part upon the first set of telematics data; and determining a second set of operation behaviors based at least in part upon the first set of telematics data; wherein the determining the second set of telematics data is further based upon the second set of operation behaviors.

Aspect 10. The computer-implemented method of aspect 9, wherein the first set of operation behaviors includes acceleration characteristics, braking characteristics, steering characteristics, and focus characteristics.

Aspect 11. The computer-implemented method of any of aspects 1-10, wherein the first set of travel conditions includes weather conditions, route conditions, route difficulties, lighting conditions, visibility conditions, or focus conditions.

Aspect 12. The computer-implemented method of any of aspects 1-11, wherein the target trip is an occurred trip or a planned trip.

Aspect 13. The computer-implemented method of aspect 12, when the target trip is an occurred trip, further comprising: identifying a data gap based at least in part upon a continuity of the obtained first set of trip data; and identifying the second time period and the target trip based at least in part upon the data gap.

Aspect 14. The computer-implemented method of aspect 13, further comprising: determining whether the second time period exceeds a predetermined duration threshold; wherein the determining the second set of telematics data occurs after determining the duration of travel exceeds the predetermined duration threshold.

Aspect 15. The computer-implemented method of any of aspects 1-14, further comprising: presenting the second set of telematics data to a user via an interactive interface.

Aspect 16. The computer-implemented method of any of aspects 1-15, further comprising: determining a set of operation behavior updates based at least in part upon the first set of telematics data and the second set of telematics data; and applying the set of operation behavior updates to an operator profile.

Aspect 17. The computer-implemented method of aspect 16, further comprising: determining a policy premium update based at least in part upon the set of operation behavior updates; and applying the policy premium update to the operator profile.

Aspect 18. The computer-implemented method of any of aspects 1-17, wherein the second set of telematics data include time series data and location data.

Aspect 19. A computing system for predicting trip data, the computing system comprising: one or more processors; and a memory storing instructions that, upon execution by the one or more processors, cause the computing system to perform one or more processes including: obtaining a first set of trip data associated with a first set of vehicular trips operated by a vehicle operator during a first time period, the first set of trip data including a first set of telematics data and a first set of travel conditions; obtaining a second set of travel conditions associated with a second set of vehicular trips associated with a second time period separate from the first time period; and determining a second set of telematics data associated with a target vehicular trip based at least in part upon the first set of telematics data, the first set of travel conditions, and the second set of travel conditions. The computing system may be configured according to device 5000 of FIG. 3 and/or system 7000 of FIG. 4 and/or to perform one or more operations of method 100 of FIG. 1.

Aspect 20. The computing system of aspect 19, wherein the one or more processes further comprising: identifying a first set of matching conditions shared between the first set of travel conditions and the second set of travel conditions; identifying a first set of condition-specific telematics data from the first set of telematics data based at least in part upon the first set of matching conditions; assigning a primary weight to each telematics data of the first set of telematics data such that higher primary weights are assigned to the first set of condition-specific telematics data; wherein the determining a second set of telematics data is further based upon the assigned primary weights of the first set of telematics data.

Aspect 21. The computing system of aspect 20, wherein the primary weight for non-condition-specific telematics data is zero such that they are not used in determining the second set of telematics data.

Aspect 22. The computing system of aspect 19, wherein the one or more processes further comprising: assigning a primary weight to each telematics data of the first set of telematics data based at least in part upon the amount of the associated travel conditions of the first set of travel conditions match with the second set of travel conditions; wherein the primary weight is positively proportional to the number of conditions matched; wherein the determining a second set of telematics data is further based upon the assigned primary weights of the first set of telematics data.

Aspect 23. The computing system of any of aspects 19-22, wherein the one or more processes further comprising: assigning a secondary weight to each telematics data of the first set of telematics data based at least in part upon how close in time the associated vehicular trip is to the target vehicular trip; wherein the determining a second set of telematics data is further based upon the assigned secondary weights of the first set of telematics data.

Aspect 24. The computing system of aspect 23, wherein the secondary weight is higher when the associated vehicular trip is closer to the target vehicular trip in time and lower when the associated vehicular trip is farther from the target vehicular trip in time.

Aspect 25. The computing system of aspect 23, wherein the secondary weight is higher when the day of week of the vehicular trip is closer to the day of week of the target vehicular trip and lower when the day of week of the vehicular trip is farther from the day of week of the target vehicular trip.

Aspect 26. The computing system of any of aspects 19-25, wherein the one or more processes further comprising: assigning a tertiary weight to each telematics data of the first set of telematics data based at least in part upon a set of behavioral ratings of importance; wherein the determining a second set of telematics data is further based upon the assigned tertiary weights of the first set of telematics data.

Aspect 27. The computing system of any of aspects 19-26, wherein the one or more processes further comprising: determining a first set of operation behaviors based at least in part upon the first set of telematics data; and determining a second set of operation behaviors based at least in part upon the first set of telematics data; wherein the determining the second set of telematics data is further based upon the second set of operation behaviors.

Aspect 28. The computing system of aspect 27, wherein the first set of operation behaviors includes acceleration characteristics, braking characteristics, steering characteristics, and focus characteristics.

Aspect 29. The computing system of any of aspects 19-28, wherein the first set of travel conditions includes weather conditions, route conditions, route difficulties, lighting conditions, visibility conditions, or focus conditions.

Aspect 30. The computing system of any of aspects 19-29, wherein the target trip is an occurred trip or a planned trip.

Aspect 31. The computing system of aspect 30, when the target trip is an occurred trip, further comprising: identifying a data gap based at least in part upon a continuity of the obtained first set of trip data; and identifying the second time period and the target trip based at least in part upon the data gap.

Aspect 32. The computing system of aspect 31, wherein the one or more processes further comprising: determining whether the second time period exceeds a predetermined duration threshold; wherein the determining the second set of telematics data occurs after determining the duration of travel exceeds the predetermined duration threshold.

Aspect 33. The computing system of any of aspects 19-32, wherein the one or more processes further comprising: presenting the second set of telematics data to a user via an interactive interface.

Aspect 34. The computing system of any of aspects 19-33, wherein the one or more processes further comprising: determining a set of operation behavior updates based at least in part upon the first set of telematics data and the second set of telematics data; and applying the set of operation behavior updates to an operator profile.

Aspect 35. The computing system of aspect 34, wherein the one or more processes further comprising: determining a policy premium update based at least in part upon the set of operation behavior updates; and applying the policy premium update to the operator profile.

Aspect 36. The computing system of any of aspects 19-35, wherein the second set of telematics data include time series data and location data.

Aspect 37. A non-transitory computer-readable medium storing instructions for predicting trip data, the instructions upon execution by one or more processors of a computing system, cause the computing system to perform one or more processes including: obtaining a first set of trip data associated with a first set of vehicular trips operated by a vehicle operator during a first time period, the first set of trip data including a first set of telematics data and a first set of travel conditions; obtaining a second set of travel conditions associated with a second set of vehicular trips associated with a second time period separate from the first time period; and determining a second set of telematics data associated with a target vehicular trip based at least in part upon the first set of telematics data, the first set of travel conditions, and the second set of travel conditions. The non-transitory computer-readable medium may be executed by one or more processors associated with device 5000 of FIG. 3 and/or system 7000 of FIG. 4 and/or to causes the corresponding system to perform one or more operations of method 100 of FIG. 1.

Aspect 38. The non-transitory computer-readable medium of aspect 37, wherein the one or more processes further comprising: identifying a first set of matching conditions shared between the first set of travel conditions and the second set of travel conditions; identifying a first set of condition-specific telematics data from the first set of telematics data based at least in part upon the first set of matching conditions; assigning a primary weight to each telematics data of the first set of telematics data such that higher primary weights are assigned to the first set of condition-specific telematics data; wherein the determining a second set of telematics data is further based upon the assigned primary weights of the first set of telematics data.

Aspect 39. The non-transitory computer-readable medium of aspect 38, wherein the primary weight for non-condition-specific telematics data is zero such that they are not used in determining the second set of telematics data.

Aspect 40. The non-transitory computer-readable medium of aspect 37, wherein the one or more processes further comprising: assigning a primary weight to each telematics data of the first set of telematics data based at least in part upon the amount of the associated travel conditions of the first set of travel conditions match with the second set of travel conditions; wherein the primary weight is positively proportional to the number of conditions matched; wherein the determining a second set of telematics data is further based upon the assigned primary weights of the first set of telematics data.

Aspect 41. The non-transitory computer-readable medium of any of aspects 37-40, wherein the one or more processes further comprising: assigning a secondary weight to each telematics data of the first set of telematics data based at least in part upon how close in time the associated vehicular trip is to the target vehicular trip; wherein the determining a second set of telematics data is further based upon the assigned secondary weights of the first set of telematics data.

Aspect 42. The non-transitory computer-readable medium of aspect 41, wherein the secondary weight is higher when the associated vehicular trip is closer to the target vehicular trip in time and lower when the associated vehicular trip is farther from the target vehicular trip in time.

Aspect 43. The non-transitory computer-readable medium of aspect 41, wherein the secondary weight is higher when the day of week of the vehicular trip is closer to the day of week of the target vehicular trip and lower when the day of week of the vehicular trip is farther from the day of week of the target vehicular trip.

Aspect 44. The non-transitory computer-readable medium of any of aspects 37-43, wherein the one or more processes further comprising: assigning a tertiary weight to each telematics data of the first set of telematics data based at least in part upon a set of behavioral ratings of importance; wherein the determining a second set of telematics data is further based upon the assigned tertiary weights of the first set of telematics data.

Aspect 45. The non-transitory computer-readable medium of any of aspects 37-44, wherein the one or more processes further comprising: determining a first set of operation behaviors based at least in part upon the first set of telematics data; and determining a second set of operation behaviors based at least in part upon the first set of telematics data; wherein the determining the second set of telematics data is further based upon the second set of operation behaviors.

Aspect 46. The non-transitory computer-readable medium of aspect 45, wherein the first set of operation behaviors includes acceleration characteristics, braking characteristics, steering characteristics, and focus characteristics.

Aspect 47. The non-transitory computer-readable medium of any of aspects 37-46, wherein the first set of travel conditions includes weather conditions, route conditions, route difficulties, lighting conditions, visibility conditions, or focus conditions.

Aspect 48. The non-transitory computer-readable medium of any of aspects 37-47, wherein the target trip is an occurred trip or a planned trip.

Aspect 49. The non-transitory computer-readable medium of aspect 48, when the target trip is an occurred trip, further comprising: identifying a data gap based at least in part upon a continuity of the obtained first set of trip data; and identifying the second time period and the target trip based at least in part upon the data gap.

Aspect 50. The non-transitory computer-readable medium of aspect 49, wherein the one or more processes further comprising: determining whether the second time period exceeds a predetermined duration threshold; wherein the determining the second set of telematics data occurs after determining the duration of travel exceeds the predetermined duration threshold.

Aspect 51. The non-transitory computer-readable medium of any of aspects 37-50, wherein the one or more processes further comprising: presenting the second set of telematics data to a user via an interactive interface.

Aspect 52. The non-transitory computer-readable medium of any of aspects 37-51, wherein the one or more processes further comprising: determining a set of operation behavior updates based at least in part upon the first set of telematics data and the second set of telematics data; and applying the set of operation behavior updates to an operator profile.

Aspect 53. The non-transitory computer-readable medium of aspect 52, wherein the one or more processes further comprising: determining a policy premium update based at least in part upon the set of operation behavior updates; and applying the policy premium update to the operator profile.

Aspect 54. The non-transitory computer-readable medium of any of aspects 37-53, wherein the second set of telematics data include time series data and location data.

One or More Examples of Machine Learning According to Various Embodiments

According to some embodiments, a processor or a processing element may be trained using supervised machine learning and/or unsupervised machine learning, and the machine learning may employ an artificial neural network, which, for example, may be a convolutional neural network, a recurrent neural network, a deep learning neural network, a reinforcement learning module or program, or a combined learning module or program that learns in two or more fields or areas of interest. Machine learning may involve identifying and recognizing patterns in existing data in order to facilitate making predictions for subsequent data. Models may be created based upon example inputs in order to make valid and reliable predictions for novel inputs.

According to certain embodiments, machine learning programs may be trained by inputting sample data sets or certain data into the programs, such as images, object statistics and information, historical estimates, and/or actual repair costs. The machine learning programs may utilize deep learning algorithms that may be primarily focused on pattern recognition and may be trained after processing multiple examples. The machine learning programs may include Bayesian Program Learning (BPL), voice recognition and synthesis, image or object recognition, optical character recognition, and/or natural language processing. The machine learning programs may also include natural language processing, semantic analysis, automatic reasoning, and/or other types of machine learning.

According to some embodiments, supervised machine learning techniques and/or unsupervised machine learning techniques may be used. In supervised machine learning, a processing element may be provided with example inputs and their associated outputs and may seek to discover a general rule that maps inputs to outputs, so that when subsequent novel inputs are provided the processing element may, based upon the discovered rule, accurately predict the correct output. In unsupervised machine learning, the processing element may need to find its own structure in unlabeled example inputs.

One or More Examples of Modules According to Various Embodiments

Additionally, certain embodiments are described herein as including logic or a number of routines, subroutines, applications, or instructions. These may constitute either software (e.g., code embodied on a non-transitory, machine-readable medium) or hardware. In hardware, the routines, etc., are tangible units capable of performing certain operations and may be configured or arranged in a certain manner. In example embodiments, one or more computing systems (e.g., a standalone, client or server computing system) or one or more hardware modules of a computing system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that may be permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that may be temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules may provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it may be communicatively coupled. A further hardware module may then, at a later time, access the memory device to retrieve and process the stored output. Hardware modules may also initiate communications with input or output devices, and may operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment, or as a server farm), while in other embodiments the processors may be distributed across a number of locations.

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Unless specifically stated otherwise, discussions herein using words such as "processing," "computing," "calculating," "determining," "presenting," "displaying," or the like may refer to actions or operations of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

Additional Considerations According to Various Embodiments

In some examples, some or all components of various embodiments of the present disclosure each are, individually and/or in combination with at least another component, implemented using one or more software components, one or more hardware components, and/or one or more combinations of software and hardware components. As an example, some or all components of various embodiments of the present disclosure each are, individually and/or in combination with at least another component, implemented in one or more circuits, such as one or more analog circuits and/or one or more digital circuits. For example, while the embodiments described above refer to particular features, the scope of the present disclosure also includes embodiments having different combinations of features and embodiments that do not include all of the described features. As an example, various embodiments and/or examples of the present disclosure can be combined.

Additionally, the methods and systems described herein may be implemented on many different types of processing devices by program code comprising program instructions that are executable by the device processing subsystem. The software program instructions may include source code, object code, machine code, or any other stored data that is operable to cause a processing system to perform the methods and operations described herein. Certain implementations may also be used, however, such as firmware or even appropriately designed hardware configured to perform the methods and systems described herein.

The systems' and methods' data (e.g., associations, mappings, data input, data output, intermediate data results, final data results) may be stored and implemented in one or more different types of computer-implemented data stores, such as different types of storage devices and programming constructs (e.g., RAM, ROM, EEPROM, Flash memory, flat files, databases, programming data structures, programming variables, IF-THEN (or similar type) statement constructs, application programming interface). It is noted that data structures describe formats for use in organizing and storing data in databases, programs, memory, or other computer-readable media for use by a computer program.

The systems and methods may be provided on many different types of computer-readable media including computer storage mechanisms (e.g., CD-ROM, diskette, RAM, flash memory, computer's hard drive, DVD) that contain instructions (e.g., software) for use in execution by a processor to perform the methods' operations and implement the systems described herein. The computer components, software modules, functions, data stores and data structures described herein may be connected directly or indirectly to each other in order to allow the flow of data needed for their operations. It is also noted that a module or processor includes a unit of code that performs a software operation and can be implemented for example as a subroutine unit of code, or as a software function unit of code, or as an object (as in an object-oriented paradigm), or as an applet, or in a computer script language, or as another type of computer code. The software components and/or functionality may be located on a single computer or distributed across multiple computers depending upon the situation at hand.

The computing system can include client devices and servers. A client device and server are generally remote from each other and typically interact through a communication network. The relationship of client device and server arises by virtue of computer programs running on the respective computers and having a client device-server relationship to each other.

This specification contains many specifics for particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations, one or more features from a combination can in some cases be removed from the combination, and a combination may, for example, be directed to a subcombination or variation of a subcombination.

Similarly, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Although specific embodiments of the present disclosure have been described, it will be understood by those of skill in the art that there are other embodiments that are equivalent to the described embodiments. Accordingly, it is to be understood that the present disclosure is not to be limited by the specific illustrated embodiments.

What is claimed is:

1. A computer-implemented method for predicting trip data, the method comprising:

obtaining, via one or more sensors of a mobile device for a vehicle operator, a first set of trip data associated with a first set of vehicular trips operated by the vehicle operator during a first time period, the first set of trip data including a first set of telematics data and a first set of travel conditions for the first set of vehicular trips, wherein a respective date and a respective day of a respective week is assigned to each telematics data of the first set of telematics data;

determining a second set of travel conditions associated with a target vehicular trip and occurring during a second time period separate from the first time period, a particular date, and a particular day of a particular week;

determining a second set of telematics data associated with the target vehicular trip comprising:

identifying, by a machine learning model, one or more patterns in the first set of telematics data and the first set of travel conditions; and determining the second set of telematics data based at least in part on the one or more patterns, as identified, and the second set of travel conditions, comprising at least one of:

(a) weighing the first set of telematics data to generate a first weighted set of telematics data using a respective primary weight for each trip within the first set of telematics data, wherein the respective primary weight weighs the telematics data of each trip within the first set of telematics data based on a respective amount of respective travel conditions of the first set of travel conditions for each trip matching a respective amount of travel conditions of the second set of travel conditions for the target vehicular trip, and wherein the respective primary weight is higher when more of the respective amount of the respective travel conditions for a particular trip within the first set of travel conditions matches the respective amount of travel conditions of the second set of travel conditions for the target vehicular trip; and (b) weighing the first set of telematics data to generate a second weighted set of telematics data using a respective secondary weight associated with the respective date or the respective day of the respective week, wherein the respective secondary weight weighs the telematics data within the first set of telematics data based at least on one of:

(1) how close the respective date assigned to the telematics data of first set of telematics data is to the particular date of the target vehicular trip, or (2) how close the respective day of the respective week assigned to the telematics data of the first set of telematics data is to the particular day of the particular week of the target vehicular trip, wherein the respective day of the respective week assigned to the telematics data of the first set of telematics data is a same day of a week as the particular day of the particular week as the target vehicular trip;

determining a set of operation behaviors based at least in part on the first set of telematics data and the second set of telematics data, as determined;

determining a policy premium based at least in part on the set of operation behaviors; and transmitting for display the policy premium, as determined, on the mobile device to the vehicle operator.

2. The computer-implemented method of claim 1, wherein the respective secondary weight for (1) is higher when the respective date assigned to the telematics data of the first set of telematics data is closer to the particular date of the target vehicular trip in time, and is lower when the respective date assigned to the telematics data of the first set of telematics data is farther from the particular date of the target vehicular trip in time.

3. The computer-implemented method of claim 1, wherein the respective secondary weight is higher for (2) when the respective day of the respective week assigned to the telematics data of the first set of telematics data is closer to the particular day of the particular week of the target vehicular trip, and is lower when the respective day of the respective week assigned to the telematics data of the first set of telematics data is farther from the particular day of the particular week of the target vehicular trip.

4. The computer-implemented method of claim 1, wherein determining the second set of telematics data further comprises:

(c) weighing the first set of telematics data to generate a third weighted set of telematics data using a respective tertiary weight, wherein the respective tertiary weight weighs the telematics data based at least in part on a set of behavior ratings of importance.

5. The computer-implemented method of claim 1, wherein:

the determining the set of operation behaviors comprises:
determining a first set of operation behaviors of the set of operation behaviors based at least in part upon the first set of telematics data; and
determining a second set of operation behaviors of the set of operation behaviors based at least in part upon the first set of telematics data; and the determining the second set of telematics data is further based upon the second set of operation behaviors.

6. The computer-implemented method of claim 5, wherein the first set of operation behaviors includes acceleration characteristics, braking characteristics, steering characteristics, and focus characteristics.

7. The computer-implemented method of claim 1, wherein the first set of travel conditions includes weather conditions, route conditions, route difficulties, lighting conditions, visibility conditions, or focus conditions.

8. The computer-implemented method of claim 1, wherein the target vehicular trip is an occurred trip or a planned trip.

9. The computer-implemented method of claim 8, when the target vehicular trip is the occurred trip, further comprising:

identifying a data gap based at least in part upon a continuity of the first set of trip data, as obtained; and
identifying the second time period and the target vehicular trip based at least in part upon the data gap.

10. The computer-implemented method of claim 9, further comprising:

determining whether the second time period exceeds a predetermined duration threshold;
wherein the determining the second set of telematics data occurs after determining that a duration of travel exceeds the predetermined duration threshold.

11. The computer-implemented method of claim 1, further comprising: presenting the second set of telematics data to a user via an interactive interface.

12. The computer-implemented method of claim 1, further comprising:

applying at least one of the set of operation behaviors or the policy premium to an operator profile.

13. The computer-implemented method of claim 12, further comprising:

obtaining, via the one or more sensors of the mobile device for the vehicle operator, a third set of trip data associated with a third set of vehicular trips operated by the vehicle operator during a third time period separate from the first time period and the second time period; and
determining, based on the one or more patterns and a third set of telematics data of the third set of trip data, whether a level for the operator profile is greater than a threshold;
wherein, upon determining that the level is greater than the threshold, determining the policy premium comprises determining the policy premium based on the one or more patterns.

14. The computer-implemented method of claim 1, wherein the second set of telematics data include time series data and location data.

15. A computing system for predicting trip data, the computing system comprising:

one or more processors; and
a memory storing instructions that, upon execution by the one or more processors, cause the computing system to perform one or more processes comprising:

obtaining, via one or more sensors of a mobile device for a vehicle operator, a first set of trip data associated with a first set of vehicular trips operated by the vehicle operator during a first time period, the first set of trip data including a first set of telematics data and a first set of travel conditions for the first set of vehicular trips, wherein a respective date and a respective day of a respective week is assigned to each telematics data of the first set of telematics data;
determining a second set of travel conditions associated with a target vehicular trip and occurring during a second time period separate from the first time period, a particular date, and a particular day of a particular week;
determining a second set of telematics data associated with the target vehicular trip comprising:
identifying, by a machine learning model, one or more patterns in the first set of telematics data and the first set of travel conditions; and
determining the second set of telematics data based at least in part on the one or more patterns, as identified, and the second set of travel conditions, comprising at least one of:
(a) weighing the first set of telematics data to generate a first weighted set of telematics data using a respective primary weight for each trip within the first set of telematics data, wherein the respective primary weight weighs the telematics data of each trip within the first set of telematics data based on a respective amount of respective travel conditions of the first set of travel conditions for each trip matching a respective amount of travel conditions of the second set of travel conditions for the target vehicular trip, and wherein the respective primary weight is higher when more of the respective amount of the respective travel conditions for a particular trip within the first set of travel conditions matches the respective amount of travel conditions of the second set of travel conditions for the target vehicular trip; and (b) weighing the first set of telematics data to generate a second weighted set of telematics data using a respective secondary weight associated with the respective date or the respective day of the respective week, wherein the respective secondary weight weighs the telematics data within the first set of telematics data based at least on one of:

(1) how close the respective date assigned to the telematics data of first set of telematics data is to the particular date of the target vehicular trip, or (2) how close the respective day of the respective week assigned to the telematics data of the first set of telematics data is to the particular day of the particular week of the target vehicular trip, wherein the respective day of the respective week assigned to the telematics data of the first set of telematics data is a same day of a week as the particular day of the particular week as the target vehicular trip;

determining a set of operation behaviors based at least in part on the first set of telematics data and the second set of telematics data as determined;

determining a policy premium based at least in part on the set of operation behaviors; and transmitting for display the policy premium, as determined, on the mobile device to the vehicle operator.

16. The computing system of claim 15, wherein the respective secondary weight for (1) is higher when the respective date assigned to the telematics data of the first set of telematics data is closer to the particular date of the target vehicular trip in time, and is lower when the respective date assigned to the telematics data of the first set of telematics data is farther from the particular date of the target vehicular trip in time.

17. The computing system of claim 15, wherein the respective secondary weight is higher for (2) when the respective day of the respective week assigned to the telematics data of the first set of telematics data is closer to the particular day of the particular week of the target vehicular trip, and is lower when the respective day of the respective week assigned to the telematics data of the first set of telematics data is farther from the particular day of the particular week of the target vehicular trip.

18. A non-transitory computer-readable medium storing instructions for predicting trip data, the instructions upon execution by one or more processors of a computing system, cause the computing system to perform one or more processes comprising:

obtaining, via one or more sensors of a mobile device for a vehicle operator, a first set of trip data associated with a first set of vehicular trips operated by the vehicle operator during a first time period, the first set of trip data including a first set of telematics data and a first set of travel conditions for the first set of vehicular trips, wherein a respective date and a respective day of a respective week is assigned to each telematics data of the first set of telematics data;

determining a second set of travel conditions associated with a target vehicular trip, and occurring during a second time period separate from the first time period, a particular date, and a particular day of a particular week;

determining a second set of telematics data associated with the target vehicular trip comprising:

identifying, by a machine learning model, one or more patterns in the first set of telematics data and the first set of travel conditions; and determining the second set of telematics data based at least in part on the one or more patterns, as identified, and the second set of travel conditions, comprising at least one of:

(a) weighing the first set of telematics data to generate a first weighted set of telematics data using a respective primary weight for each trip within the first set of telematics data, wherein the respective primary weight weighs the telematics data of each trip within the first set of telematics data based on a respective amount of respective travel conditions of the first set of travel conditions for each trip matching a respective amount of travel conditions of the second set of travel conditions for the target vehicular trip, and wherein the respective primary weight is higher when more of the respective amount of the respective travel conditions for a particular trip within the first set of travel conditions matches the respective amount of travel conditions of the second set of travel conditions for the target vehicular trip; and (b) weighing the first set of telematics data to generate a second weighted set of telematics data using a respective secondary weight associated with the respective date or the respective day of the respective week, wherein the respective secondary weight weighs the telematics data within the first set of telematics data based on at least one of:

(1) how close the respective date assigned to the telematics data of first set of telematics data is to the particular date of the target vehicular trip, or (2) how close the respective day of the respective week assigned to the telematics data of the first set of telematics data is to the particular day of the particular week of the target vehicular trip, wherein the respective day of the respective week assigned to the telematics data of the first set of telematics data is a same day of a week as the particular day of the particular week as the target vehicular trip;

determining a set of operation behaviors based at least in part on the first set of telematics data and the second set of telematics data, as determined;

determining a policy premium based at least in part on the set of operation behaviors; and transmitting for display the policy premium, as determined, on the mobile device to the vehicle operator.

19. The non-transitory computer-readable medium storing instructions in claim 18, wherein the respective secondary weight for (1) is higher when the respective date assigned to the telematics data of the first set of telematics data is closer to the particular date of the target vehicular trip in time and lower when the respective date assigned to the telematics data of the first set of telematics data is farther from the particular date of the target vehicular trip in time.

20. The non-transitory computer-readable medium storing instructions in claim 18, wherein the respective secondary weight is higher when the respective day of the respective week assigned to the telematics data of the first set of telematics data is closer to the particular day of the particular week of the target vehicular trip, and is lower when the respective day of the respective week assigned to the telematics data of the first set of telematics data is farther from the particular day of the particular week of the target vehicular trip.

\* \* \* \* \*